US012613017B2

(12) United States Patent
Li

(10) Patent No.: US 12,613,017 B2
(45) **Date of Patent: *Apr. 28, 2026**

(54) ADJUSTABLE ELECTRONIC CANDLE

(71) Applicant: Liown Electronics Co., Ltd., Shenzhen (CN)

(72) Inventor: Xiaofeng Li, Shenzhen (CN)

(73) Assignee: Liown Electronics Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,882

(22) Filed: Nov. 25, 2024

(65) Prior Publication Data

US 2025/0198581 A1 Jun. 19, 2025

Related U.S. Application Data

(63) Continuation of application No. 18/361,296, filed on Jul. 28, 2023, now Pat. No. 12,152,743.

(30) Foreign Application Priority Data

Jul. 29, 2022 (CN) ......................... 202210903846.0
Jul. 29, 2022 (CN) ......................... 202210904030.X
Jul. 29, 2022 (CN) ......................... 202221981373.8
Jul. 29, 2022 (CN) ......................... 202221998487.3
Jul. 29, 2022 (CN) ......................... 202221999425.4
Jul. 29, 2022 (CN) ......................... 202222002206.0
Jul. 29, 2022 (CN) ......................... 202222002208.X
Jul. 29, 2022 (CN) ......................... 202222002209.4
Jul. 29, 2022 (CN) ......................... 202222002210.7

(51) Int. Cl.
*F21S 10/04* (2006.01)
*F21V 21/22* (2006.01)

(52) U.S. Cl.
CPC .............. *F21S 10/04* (2013.01); *F21V 21/22* (2013.01)

(58) Field of Classification Search
CPC ........ F21S 10/04; F21S 10/043; F21S 10/046; F21S 6/001; F21V 21/22; F21W 2121/00
See application file for complete search history.

(56) References Cited

U.S. PATENT DOCUMENTS 8,602,610 B1 12/2013 Lauer
10,352,517 B2 7/2019 Carpintero
11,262,049 B2 * 3/2022 Li ........................... F21S 6/001
2015/0369432 A1 * 12/2015 Li ......................... F21V 23/003
362/249.02
2016/0057829 A1 2/2016 Li
(Continued)

*Primary Examiner* — Robert J May
(74) *Attorney, Agent, or Firm* — Perkins Coie LLP

(57) ABSTRACT

Methods, systems and devices related to an electronic candle device having an adjustable height are disclosed. In one example aspect, an electronic candle device includes a flame sheet and a candle body. The candle body includes an upper housing that comprises an opening, a lower housing, an extendable and retractable apparatus coupled to the upper housing and the lower housing, and a motor coupled to the extendable and retractable apparatus. Upon driven by the motor, the extendable and retractable apparatus is configured to pull the upper housing and the lower housing together to at least partially overlap with each other or separate the upper housing and the lower housing such that a height of the electronic candle device is adjustable.

20 Claims, 37 Drawing Sheets

(a) (b) (c)

(56) References Cited

U.S. PATENT DOCUMENTS

| | | | |
|---|---|---|---|
| 2017/0067608 A1 | 3/2017 | Patton | |
| 2017/0191630 A1 | 7/2017 | Lentine | |
| 2019/0072251 A1 | 3/2019 | Carpintero et al. | |
| 2019/0101264 A1 | 4/2019 | Li | |
| 2020/0200368 A1 | 6/2020 | Li | |
| 2021/0048173 A1 | 2/2021 | Li | |

* cited by examiner

ADJUSTABLE ELECTRONIC CANDLE

CROSS-REFERENCE TO RELATED APPLICATIONS

This patent document is a continuation of U.S. patent application Ser. No. 18/361,296, filed Jul. 28, 2023, which further claims priority to Chinese Patent Application No. 202210903846.0, filed on Jul. 29, 2022, Chinese Patent Application No. 202210904030.X, filed on Jul. 29, 2022, Chinese Patent Application No. 202221981373.8, filed on Jul. 29, 2022, Chinese Patent Application No. 202221998487.3, filed on Jul. 29, 2022, Chinese Patent Application No. 202221999425.4, filed on Jul. 29, 2022, Chinese Patent Application No. 202222002206.0, filed on Jul. 29, 2022, Chinese Patent Application No. 202222002208.X, filed on Jul. 29, 2022, Chinese Patent Application No. 202222002209.4, filed on Jul. 29, 2022, and Chinese Patent Application No. 202222002210.7, filed on Jul. 29, 2022. The entire content of the before mentioned patent applications is incorporated by reference in this patent document.

TECHNICAL FIELD

The present disclosure relates to electronic candles, and more particularly, to electronic candles with height adjustment function.

BACKGROUND

Electronic candles have developed from initial designs by simply simulating the shape of real candles, to electronic music fountain candles that can simulate the sound effects of fountains, to electronic candles that have increasing numbers of functions and styles. Electronic candles not only have the practicality and safety of lighting, but also have ornamental and decorative features. Electronic candles that simulate real fire are highly popular because their light-emitting components can simulate the burning form of traditional candles, creating a tranquil and peaceful atmosphere and making people feel relaxed. More and more people choose to use them as a kind of decorative products.

Currently, with the continuous advancement of science and technology, various new technologies have emerged, and the electronic candle industry also needs to constantly innovate and further improve the designs. However, people's attention to electronic candles is still mostly focused on the realistic appearance and lighting effects, ignoring improvements in other aspects.

SUMMARY

Techniques related to implementing an electronic candle device having an adjustable height are disclosed.

In one example aspect, an electronic candle device includes a flame sheet and a candle body. The candle body includes an upper housing that comprises an opening, a lower housing, an extendable and retractable apparatus coupled to the upper housing and the lower housing, and a motor coupled to the extendable and retractable apparatus. Upon driven by the motor, the extendable and retractable apparatus is configured to pull the upper housing and the lower housing together to at least partially overlap with each other or separate the upper housing and the lower housing such that a height of the electronic candle device is adjustable.

These, and other, aspects are described in the present document.

DETAILED DESCRIPTION

Section headings are used in the present document only to improve readability and do not limit scope of the disclosed embodiments and techniques in each section to only that section.

Table of Elements

| Element Number | Element Description |
|---|---|
| 1 | Upper housing top surface |
| 2 | Upper housing side surface |
| 3 | Lower/base housing side surface |
| 4 | Lower/base housing bottom surface |
| 5 | Protective cap |
| 6 | Touch key/touch sensor |
| 7 | Touch screen |
| 10 | Heating simulation apparatus |
| 11 | Flame sheet opening |
| 12 | Candlestick Body |
| 13 | Load bearing base |
| 14 | Tray |
| 16 | Heating device |
| 17 | Fan |
| 18 | Candlestick |
| 21 | Flame simulation device |
| 22 | Lifting device |
| 23 | Lifting drive device |
| 24 | Power supply module |
| 25 | External power supply interface; charging port |
| 26 | Wireless charging coil |
| 27 | Indicator light |
| 28 | Horn-shaped cavity |
| 29 | Air testing module |
| 30 | Mode switching circuit |
| 31 | Drive device |
| 32 | Extendable and retractable device |
| 33 | Magnetic block |
| 34 | Magnetic attachment device |
| 35 | Main control unit |
| 36 | Time calculating unit |
| 37 | Timing unit |
| 38 | Vent |
| 40 | Power switch |
| 41 | Energy storage module; rechargeable battery |
| 42 | Charging module |
| 43 | Display module |
| 45 | Blow-out simulation apparatus |
| 46 | Pickup |
| 47 | Acoustic wave detection circuit |
| 50 | Ignition simulation apparatus |
| 51 | First display drive unit |
| 52 | Second display drive unit |
| 53 | Third display drive unit |
| 54 | Wick |
| 55 | Wick reset apparatus |
| 56 | Temperature sensor |
| 57 | Temperature detection circuit |
| 60 | Touch turn on/off simulation device |
| 61 | First display region |
| 70 | Low-power shutdown module |
| 71 | Control processor |
| 72 | Power supply monitoring |
| 73 | Drive control circuit |
| 74 | Indicator light drive circuit |
| 75 | Switch control circuit |
| 80 | Testing motherboard |
| 81 | Sensor arrays |
| 82 | Sensor unit |
| 83 | Ambient temperature sensor |
| 84 | Humidity sensor |
| 85 | Testing module controller |
| 86 | Wireless communication apparatus |
| 89 | Alarm apparatus |
| 100 | Sensing element |
| 111 | Candle body |
| 112 | Base |
| 130 | Frame |
| 141 | Driving motor |
| 142 | Gear set |
| 143 | Frame rack |
| 144 | Base rack |
| 145 | Linkage slide block |
| 146 | Frame guide groove |
| 147 | Frame buffer member |
| 161 | Closing member |
| 162 | Closing reset member |
| 432 | First toothed segment |
| 433 | First smooth segment |
| 441 | Base guide column |
| 442 | Second toothed segment |
| 443 | Second smooth segment |
| 1031 | Lamp bracket rack |
| 1032 | Base rack |

Figure 1:
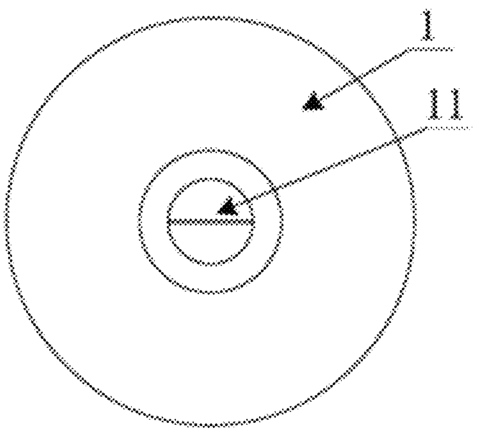
FIG. 1 illustrates a top view of an example electronic candle in accordance with one or more embodiments of the present technology.
Figure 2:
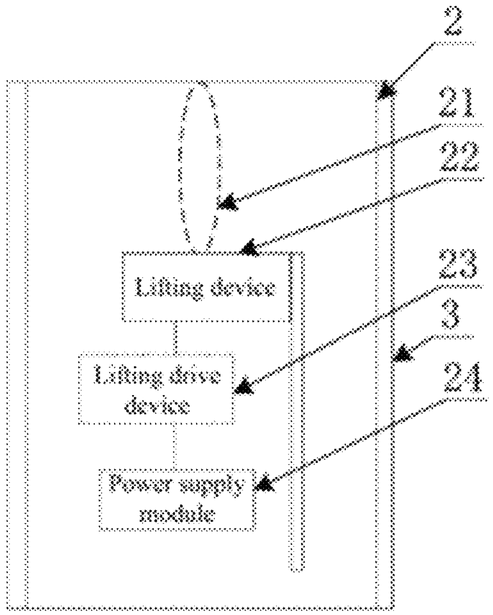
FIG. 2 illustrates a side view of the example electronic candle in FIG. 1 in accordance with one or more embodiments of the present technology.
Figure 3:
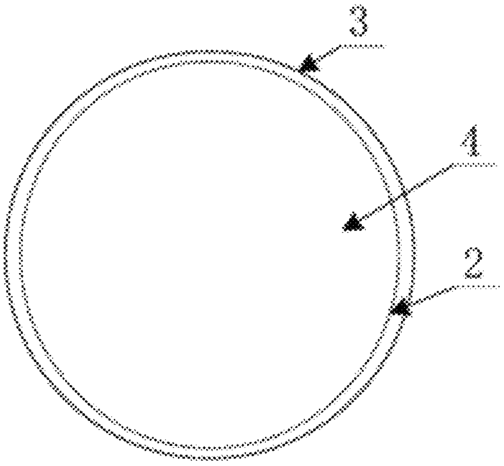
FIG. 3 illustrates a bottom view of the example electronic candle in FIG. 1 in accordance with one or more embodiments of the present technology.

FIGS. 1, 2 and 3 illustrate a top view, a side view, and a bottom view of an example electronic candle in accordance with one or more embodiments of the present technology. The electronic candle includes a housing. The housing is formed by coupling (e.g., snap-fitting) a cylindrical upper housing and a cylindrical lower housing. A cavity is formed within the housing of the electronic candle. The upper housing includes an upper housing top surface 1 and an upper housing side surface 2, and the lower housing includes a lower housing bottom surface 4 and a lower housing side surface 3. A flame sheet opening 11 is provided on the upper housing surface 1. A flame simulation device 21 (e.g., a flame sheet), a lifting device 22, a lifting drive device 23, and a power supply module 24 are positioned within the cavity. The power supply module 24 is connected to the lifting drive device 23, and the power supply module 24 is used for providing the lifting drive device 23 with a power supply. The lifting drive device 23 is connected to the lifting device 22, and the lifting drive device 23 is used for providing the lifting device 22 with a driving force. The lifting device 22 is connected to the flame simulation device 21, and is used for, when obtaining the driving force provided by the lifting drive device 23, lifting the flame simulation device 21 from the flame sheet opening 11 provided on the upper housing surface 1. The flame simulation device 21 is used for simulating a candle flame after being lifted from the flame sheet opening provided on the upper housing surface 1.

Figure 4:
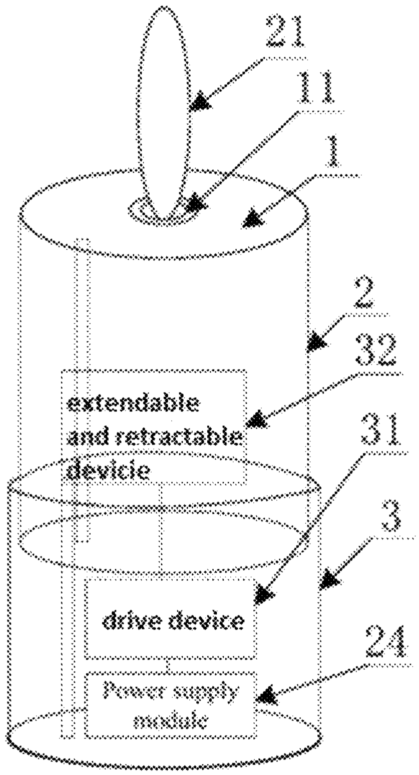
FIG. 4 is a schematic diagram of example structures in an electronic candle with height adjustment functionality in accordance with one or more embodiments of the present technology.

FIG. 4 is a schematic diagram of example structures in an electronic candle with height adjustment functionality in accordance with one or more embodiments of the present technology. An extendable and retractable device 32 and a drive device 31 are positioned within the cavity of the electronic candle. The power supply module 24 is further connected to the drive device 31, and the power supply module 24 is further used for providing the drive device 31 with a power supply. The drive device 31 is connected to the extendable and retractable device 32. The drive device 31 is used for providing the extendable and retractable device 31 with a driving force. The extendable and retractable device 32 is separately connected to the upper housing and the lower housing. The extendable and retractable device 32 is used for, when obtaining the driving force provided by the extendable and retractable drive device 31, pulling together or separating the upper housing and the lower housing to reduce or increase the height of the electronic candle. In some embodiments, the lifting drive device 23 and the drive device 31 share a stepping motor. In some embodiments, the extendable and retractable device comprises two tracks 401, 402, coupled to the upper housing and the lower housing respective, to enable movement of the upper housing and lower housing with respect to each other.

Figure 5:
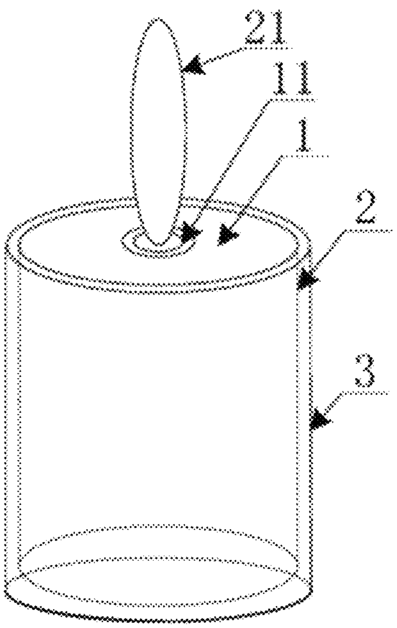
FIG. 5 illustrates an example housing when the height of an electronic candle is at the lowest point in accordance with one or more embodiments of the present technology.
Figure 6:
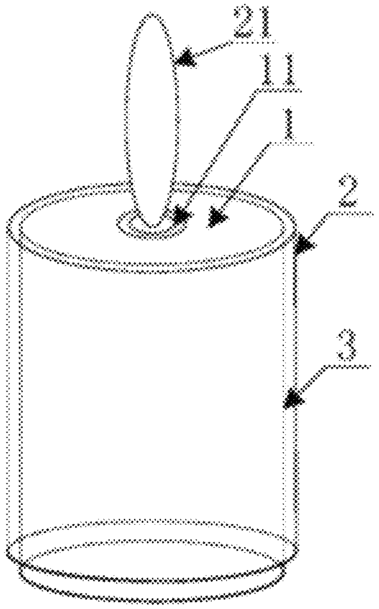
FIG. 6 illustrates another example housing of an electronic candle in accordance with one or more embodiments of the present technology.

FIG. 5 illustrates an example housing when the height of an electronic candle is at the lowest point in accordance with one or more embodiments of the present technology. In some embodiments, when the height of the electronic candle reaches the lowest point, the upper housing is fully positioned within the lower housing. FIG. 6 illustrates another example housing of an electronic candle in accordance with one or more embodiments of the present technology. In some embodiments, when the height of the electronic candle reaches the lowest point, the lower housing is fully positioned within the upper housing.

Figure 7:
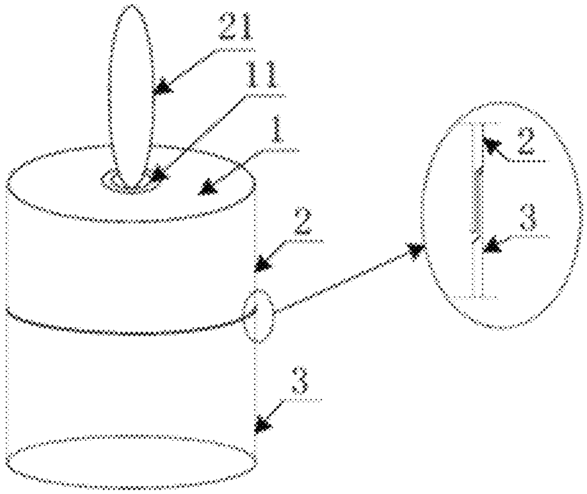
FIG. 7 illustrates another example housing of an electronic candle in accordance with one or more embodiments of the present technology.
Figure 8:
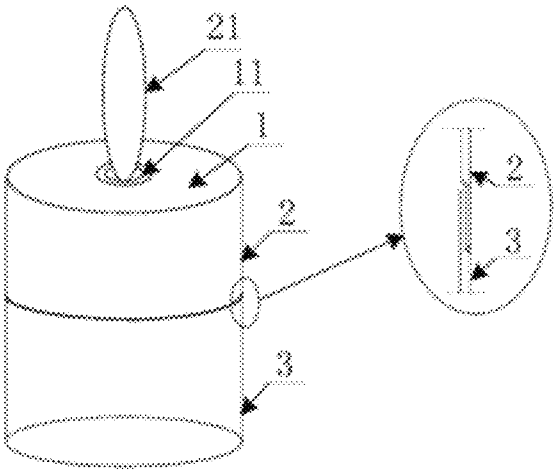
FIG. 8 illustrates yet another example housing of an electronic candle in accordance with one or more embodiments of the present technology.

FIG. 7 illustrates another example housing of an electronic candle in accordance with one or more embodiments of the present technology. In some embodiments, when the height of the electronic candle reaches the lowest point, the upper housing is partially positioned within the lower housing. FIG. 8 illustrates yet another example housing of an electronic candle in accordance with one or more embodiments of the present technology. In some embodiments, when the height of the electronic candle reaches the lowest point, the lower housing is partially positioned within the upper housing.

Figure 9:
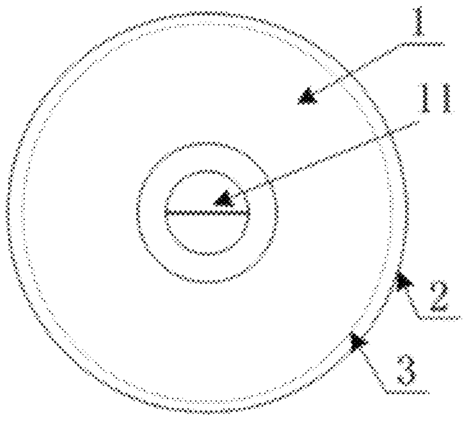
FIG. 9 illustrates a top view of an example electronic candle in accordance with one or more embodiments of the present technology.
Figure 10:
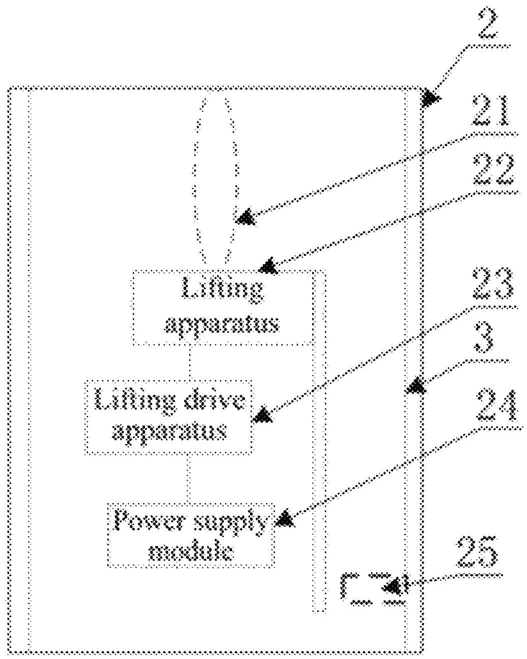
FIG. 10 illustrates a side view of the electronic candle in FIG. 9 in accordance with one or more embodiments of the present technology.
Figure 11:
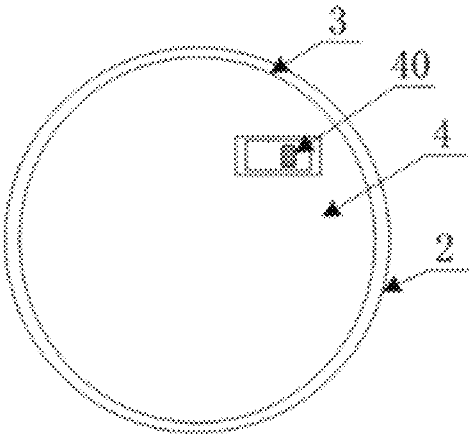
FIG. 11 illustrates a bottom view of the electronic candle in FIG. 9 in accordance with one or more embodiments of the present technology.

FIGS. 9, 10, and 11 illustrates a top view, a side view, and a bottom view of another example electronic candle in accordance with one or more embodiments of the present technology. The electronic candle includes a housing. The housing is formed by connecting a cylindrical upper housing body and a cylindrical lower housing body. The housing includes a cavity. The upper housing body includes an upper housing surface 1 and an upper housing side surface 2. The lower housing body includes a lower housing bottom surface 4 and a lower housing side surface 3. The upper housing top surface 1 includes an opening 11. A flame simulating apparatus 21, a lifting apparatus 22, a lifting drive apparatus 23, and a power supply module 24 are provided in the cavity. The power supply module 24 is connected to the lifting drive apparatus 23, and the power supply module 24 is configured to supply power to the lifting drive apparatus 23. The lifting drive apparatus 23 is connected to the lifting apparatus 22, and the lifting drive apparatus 23 is configured to provide a driving force to the lifting apparatus 22. The lifting apparatus 22 is connected to the flame simulating apparatus 21 and is configured to lift the flame simulating apparatus 21 from the opening 11 provided in the upper housing front surface 1 when the driving force provided by the lifting drive apparatus 23 is acquired. The flame simulating apparatus 21 is configured to simulate a candle flame after being lifted from the opening 11 provided in the upper housing front surface 1. In an embodiment, a power switch 40 of the electronic candle is provided on the lower housing bottom surface 4.

Figure 12:
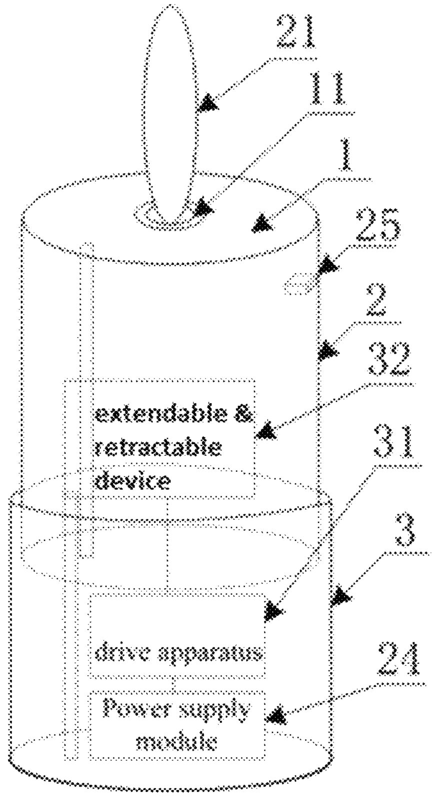
FIG. 12 is a schematic diagram of example structures in an electronic candle with height adjustment functionality in accordance with one or more embodiments of the present technology.

FIG. 12 is a schematic diagram of example structures in an electronic candle with height adjustment functionality in accordance with one or more embodiments of the present technology. The extendable and retractable apparatus 32 and a drive apparatus 31 are provided in the cavity of the housing. The drive apparatus 31 is connected to the extendable and retractable apparatus 32, and the drive apparatus 31 is configured to provide a driving force to the extendable and retractable apparatus 32. The extendable and retractable apparatus 32 is connected to the upper housing body and the lower housing body, respectively. The extendable and retractable 32 is configured to pull or separate the upper housing body and the lower housing body when the driving force provided by the drive apparatus 31 is acquired. In some embodiments, the extendable and retractable device comprises two tracks 1201, 1202, coupled to the upper housing and the lower housing respective, to enable movement of the upper housing and lower housing with respect to each other.

Figure 13:
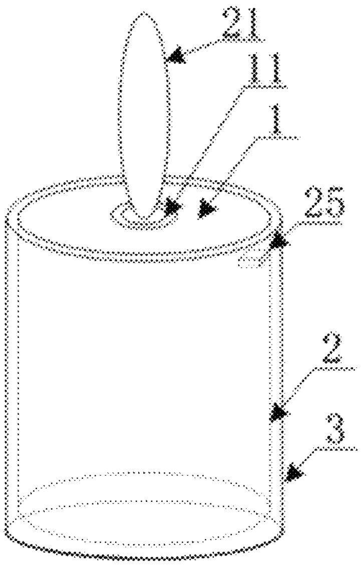
FIG. 13 illustrates an example connection mechanism between an upper housing body and a lower housing body in accordance with one or more embodiments of the present technology.
Figure 14:
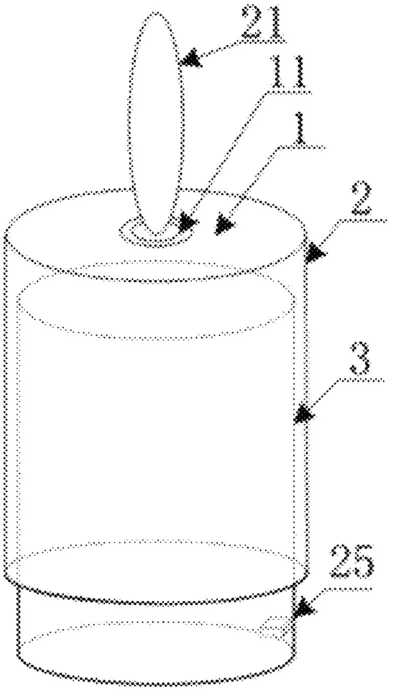
FIG. 14 illustrates another example connection mechanism between an upper housing body and a lower housing body in accordance with one or more embodiments of the present technology.

FIG. 13 illustrates an example connection mechanism between an upper housing body and a lower housing body in accordance with one or more embodiments of the present technology. When the upper housing body and the lower housing body are coupled, the external power supply interface 25 is disposed on the upper housing side surface 2. The lower housing side surface 3 completely covers the external power supply interface 25. FIG. 14 illustrates another example connection mechanism between an upper housing body and a lower housing body in accordance with one or more embodiments of the present technology. When the upper housing body and the lower housing body are coupled, the external power supply interface 25 is disposed on the lower housing side surface. The upper housing side surface 2 completely covers the external power supply interface 25. When the upper housing body and the lower housing body are separated, the external power supply interface 25 that is disposed on the upper housing side surface 2 or the lower housing side surface 3 is exposed to the outside for the input of the external power supply.

Figure 15:
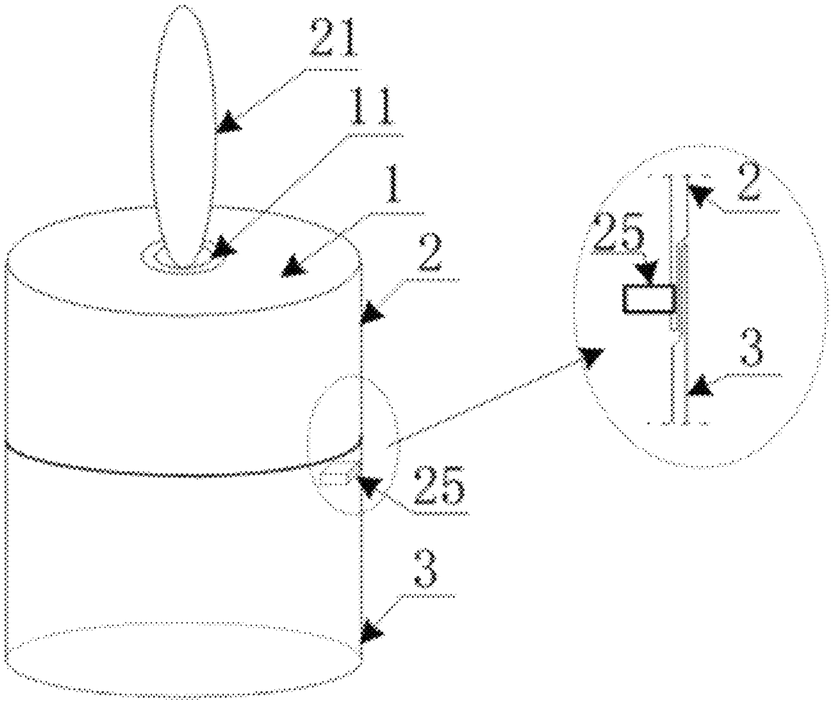
FIG. 15 illustrates an example housing of an electronic candle in accordance with one or more embodiments of the present technology.
Figure 16:
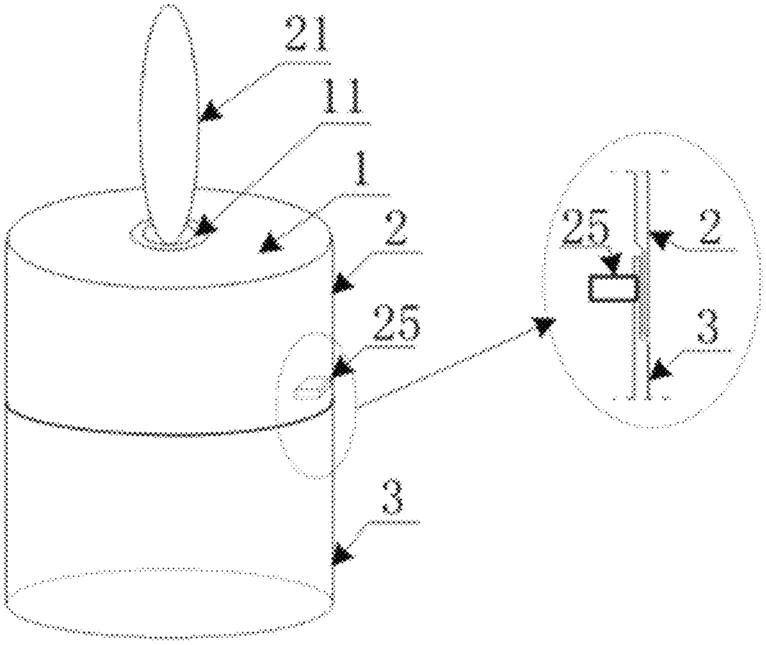
FIG. 16 illustrates another example housing of an electronic candle in accordance with one or more embodiments of the present technology.

FIG. 15 illustrates an example housing of an electronic candle in accordance with one or more embodiments of the present technology. When the upper housing body and the lower housing body are coupled, the upper housing side surface is partially positioned inside of the lower housing side surface. FIG. 16 illustrates another example housing of an electronic candle in accordance with one or more embodiments of the present technology. When the upper housing body and the lower housing body are coupled, the lower housing side surface 3 is partially positioned inside of the upper housing side surface 2.

Figure 17:
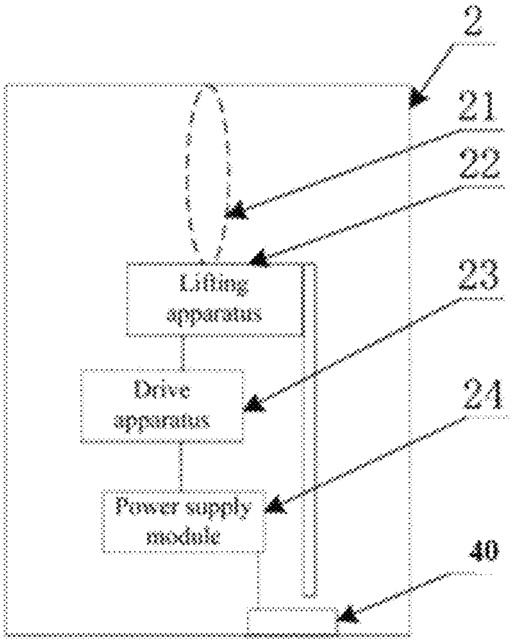
FIG. 17 illustrates a side view of an example electronic candle in accordance with one or more embodiments of the present technology.
Figure 18:
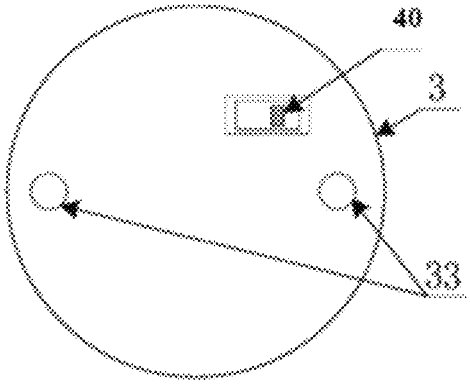
FIG. 18 illustrates a bottom view of the electronic candle shown in FIG. 17 in accordance with one or more embodiments of the present technology.

FIGS. 17 and 18 illustrate a side view and a bottom view of an example electronic candle in accordance with one or more embodiments of the present technology. The electronic candle includes a cylindrical housing. The upper housing top surface 1 (not shown) includes an opening 11. The lower housing bottom surface 4 includes a power switch 40. The side surface 2 includes a curved screen. A flame simulating apparatus 21, a lifting apparatus 22, a lifting drive apparatus 23, and a power supply module 24 are provided in the housing. The power supply module 24 is separately connected to the drive apparatus 23 and the power switch 40. When the power switch 40 is turned on, the power supply module 24 provides power to the drive apparatus. The drive apparatus 23 is connected to the lifting apparatus 22, and the drive apparatus 23 is used for providing a driving force to the lifting apparatus 22. The lifting apparatus 22 is connected to the flame simulating apparatus 21 (e.g., a flame sheet). The lifting apparatus 22 is used for, when obtaining the driving force provided by the drive apparatus 23, lifting the flame simulating apparatus 21 from the opening 11 provided on the upper top surface 1. The flame simulating apparatus 21 is used for simulating a candle flame after being lifted from the opening 11.

Figure 19:
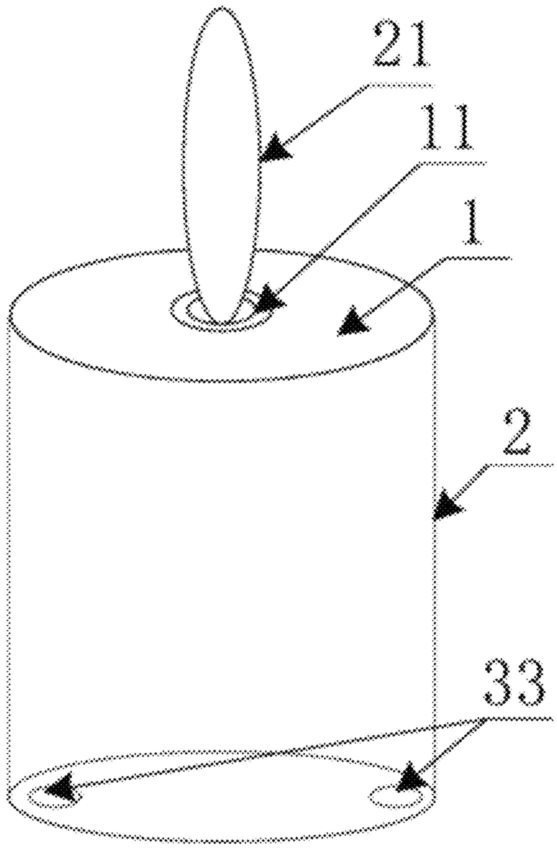
FIG. 19 illustrates an example three-dimensional structure of an electronic candle in accordance with one or more embodiments of the present technology.

FIG. 19 illustrates an example three-dimensional structure of an electronic candle in accordance with one or more embodiments of the present technology. In this example, a magnetic block 33 is provided on the bottom surface 4 of the housing. The magnetic block 33 is used for attaching to metal to stabilize the electronic candle when the electronic candle is placed on a flat metal surface.

Figure 20:
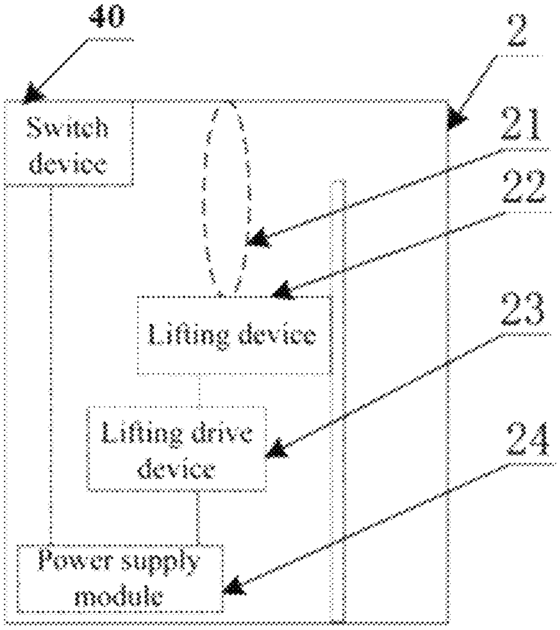
FIG. 20 illustrates a side view of an example electronic candle in accordance with one or more embodiments of the present technology.
Figure 21:
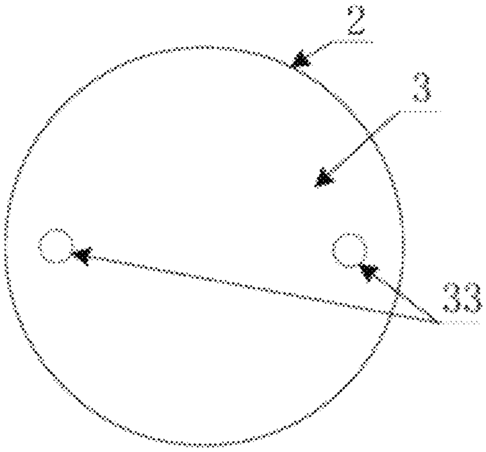
FIG. 21 illustrates a bottom view of the electronic candle shown in FIG. 20 in accordance with one or more embodiments of the present technology.

FIGS. 20 and 21 illustrate a side view and a bottom view of an example electronic candle in accordance with one or more embodiments of the present technology. The candle body comprises a housing. The housing is a closed cylinder surrounded by a top surface 1 (not shown), a side surface 2, and a bottom surface 3. A cavity is formed within the housing. A flame sheet opening 11 is provided on the top surface 1. A protective cap (not shown) is movably connected to an outer edge of the top surface 1. A flame simulation device 21, a lifting device 22, a lifting drive device 23, a power supply module 24, and a switch device 40 are positioned within the cavity. The power supply module 24 is connected to the lifting drive device 23, and the power supply module 24 is used for supplying power to the lifting drive device 23. The lifting drive device 23 is connected to the lifting device 22, and the lifting drive device 23 is used for providing the lifting device 22 with a driving force. The lifting device 22 is connected to the flame simulation device 21, and is used for, when obtaining the driving force provided by the lifting drive device 22, raising the flame simulation device 21 from the flame sheet opening 11 provided on the top surface 1. The flame simulation device 21 is used for simulating a candle flame after being raised from the flame sheet opening 11 provided on the top surface 1. The switch device 40 is provided on the outer edge of the top surface I and is electrically connected to the power supply module 24. When the protective cap is fastened to the outer edge of the top surface 1, the switch device 40 turns off the power supply module 24 to stop supplying power to the lifting drive device 23. In some embodiments, the switch device 40 is a fastening switch.

Charging of Electronic Candles

Figure 22:
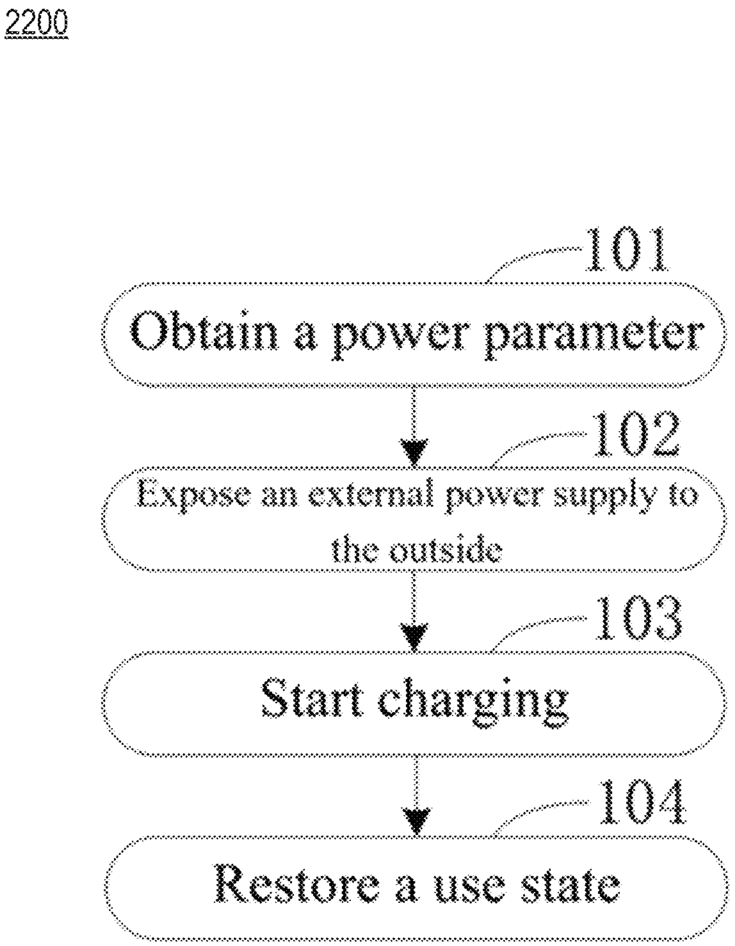
FIG. 22 is a flowchart representation of an example method for charging an electronic candle in accordance with one or more embodiments of the present technology.

FIG. 22 is a flowchart representation of an example method for charging an electronic candle in accordance with one or more embodiments of the present technology. The method 2200 includes, at operation 101, obtaining the power parameter. The power parameter is obtained by means of monitoring the rechargeable battery. The method 2200 includes, at operation 102, exposing the external power supply to the outside. The flame simulating apparatus is restored back into the cavity of the electronic candle when the power parameter of the rechargeable battery is not greater than a preset threshold value. The upper housing body and the lower housing body of the housing of the electronic candle are separated to expose the external power supply interface to the outside. The method 2200 includes, at operation 103, starting charging. The external power supply is connected to the external power supply interface to charge the rechargeable battery. During charging, the charging progress is displayed by the indicator light that is on the external power supply interface. The method 2200 includes, at operation 104, restoring a use state. When charging of the rechargeable battery ends or when the power parameter of the rechargeable battery is greater than a preset threshold value, and no external power supply is connected to the external power supply interface, the upper housing body and the lower housing body are completely coupled to restore the use state of the electronic candle.

Figure 23A:
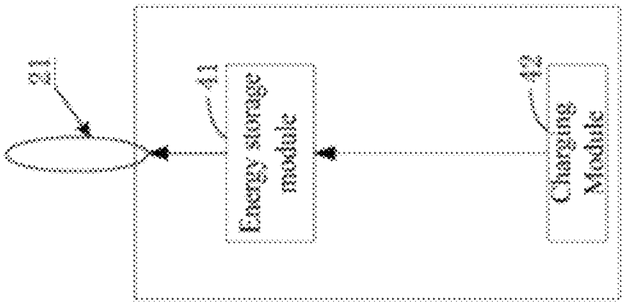
FIG. 23A illustrates an example power supply module in an electronic candle in accordance with one or more embodiments of the present technology.
Figure 23B:
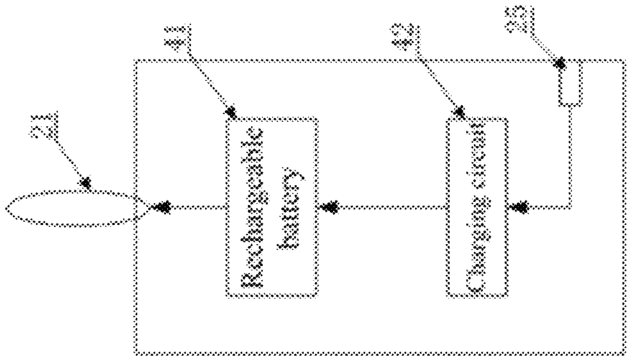
FIG. 23B is another example power supply module in an electronic candle in accordance with one or more embodiments of the present technology.

FIG. 23A illustrates an example power supply module in an electronic candle in accordance with one or more embodiments of the present technology. In some embodiments, the power supply module includes an energy storage module 41 and a charging module 42. The charging module 42 is used for charging the energy storage module 41. In some embodiments, as shown in FIG. 23B, the energy storage module 41 is a rechargeable battery. In some embodiments, the charging module 42 includes a wireless charging circuit. The wireless charging circuit is used for charging the energy storage module 41 by means of wireless charging. In some embodiments, the power supply module 42 includes an external power supply interface, and the external power supply interface is used for externally connecting a charging power supply to charge the energy storage module 41. In some embodiments, the external power supply interface is provided on the lower housing surface. In some embodiments, the external power supply interface is a TYPE-C interface.

Figure 24A:
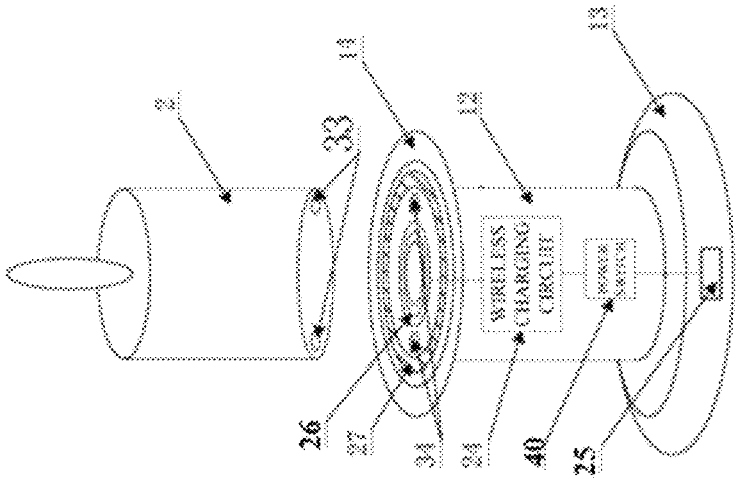
FIG. 24A illustrates an example electronic candle with a tray in accordance with one or more embodiments of the present technology.

FIG. 24A illustrates an example electronic candle with a candlestick in accordance with one or more embodiments of the present technology. An electronic candle includes an upper housing comprising a side surface 2. The electronic candle can be removably connected to a candle stick having a tray 14 and a candle stick body 12 positioned on a load bearing base 13. The body 12 is configured to connect the load bearing base 13 and the tray 14. The tray 14 is removably coupled to the bottom of the electronic candle to hold the electronic candle. The load bearing base 13 is configured to maintain the stability of the housing when being placed on a flat surface. The load bearing base 13 includes an external power interface 25 for external power input. A power supply module 24 (e.g., a wireless charging circuit) is positioned within the housing. In some embodiments, the tray 14 includes a wireless charging coil 26. The wireless charging circuit 24 is electrically connected to the external power interface 25 and the wireless charging coil 26 for wireless charging (e.g., by means of the wireless charging coil 26). The upper housing is removably connected to the tray 14 with electrical energy input from the external power interface 25. The tray 14 includes a first magnetic attachment device 34. The bottom of the electronic candle includes a second magnetic attachment device 33 such that the tray 14 and the electronic candle can be coupled together.

In some embodiments, the first magnetic attachment device 34 is a magnetic block, and the second magnetic attachment device 33 is a metal block. In some embodiments, the second magnetic attachment device 33 is a magnetic block, and the first magnetic attachment device 34 is a metal block. In some embodiments, the tray 14 includes a position mark 27. The position mark 27 indicates a contact region of the tray 14 with the bottom of the electronic candle.

Figure 24B:
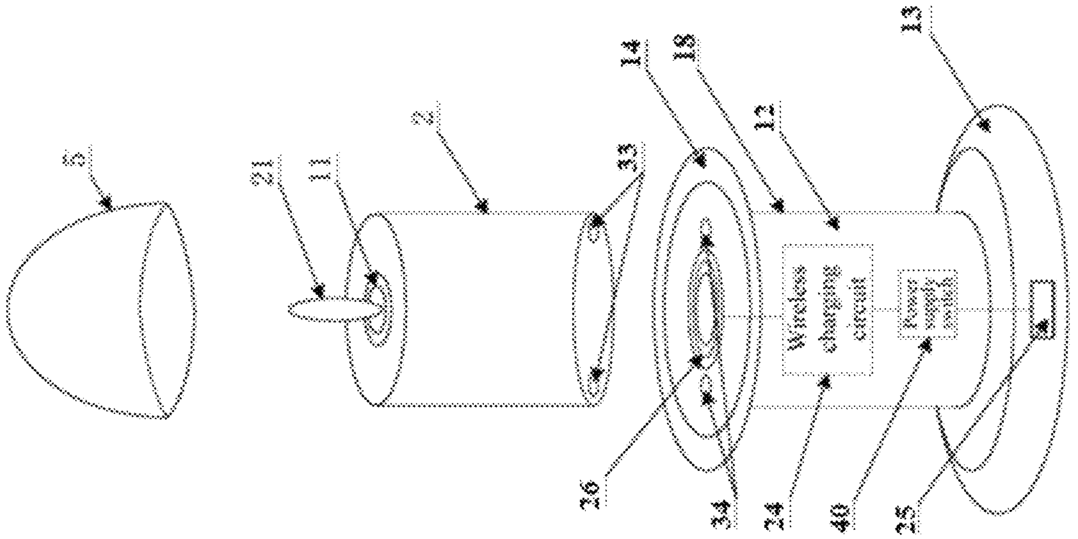
FIG. 24B illustrates an example electronic candle with a tray and a protective cap in accordance with one or more embodiments of the present technology.

FIG. 24B illustrates an example electronic candle with a tray and a protective cap in accordance with one or more embodiments of the present technology. This example includes a protective cap 5 that can be a transparent circular arch shaped structure. In some embodiments, the electronic candle further comprises an electronic candlestick 18. The electronic candlestick 18 comprises a load-bearing base 13, a candlestick body 12 and a tray 14. The candlestick body 12 is configured to connect the load-bearing base 13 and the tray 14. The tray 14 is removably connected to the bottom surface 4 of the housing. The load-bearing base 13 is configured to keep the candle body stable. In some embodiments, the load-bearing base 13 includes an external power supply interface 25 for external power supply input. A wireless charging circuit 24 is positioned within the electronic candlestick 5. In some embodiments, the tray 14 includes a wireless charging coil 26. The wireless charging circuit is electrically connected to the external power supply interface and the wireless charging coil 26 respectively. The wireless charging circuit is configured to wirelessly charge the wireless charging device, via the wireless charging coil 26, using electrical energy inputted to the external power supply interface 25. In some embodiments, the external power supply interface 25 is a Type-C interface. In some embodiments, a power supply switch 40 is positioned on the candlestick body 12. The power supply switch 40 is positioned between the wireless charging circuit 56 and the external power supply interface 25 to connect or disconnect the wireless charging circuit and the external power supply interface 25. In some embodiments, magnetic attachment devices 34 (e.g., metal blocks) are positioned on the tray 14 and magnetic blocks 33 are provided on the bottom surface of the housing. The candle body can be removably coupled to the tray 14 via the magnetic blocks 33 provided on the bottom surface and the metal blocks 34 on the tray 14.

Figure 25B:
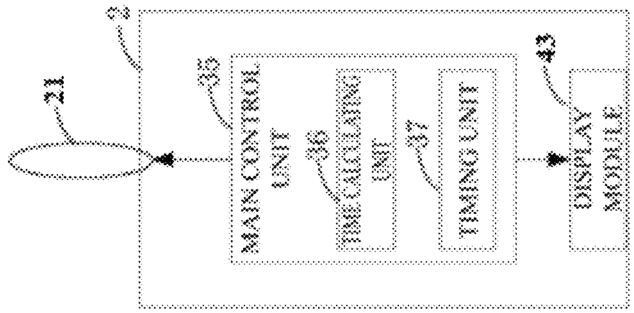
FIG. 25B illustrates a schematic structural view of another electronic candle in accordance with one or more embodiments of the present technology.
Figure 25A:
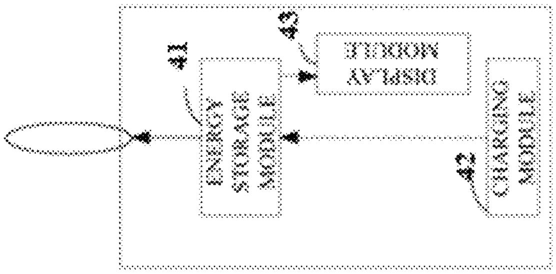
FIG. 25A illustrates a schematic structural view of an electronic candle in accordance with one or more embodiments of the present technology.

FIG. 25A illustrates a schematic structural view of an electronic candle in accordance with one or more embodiments of the present technology. The electronic candle includes an energy storage module 41 and a charging module 42. The energy storage module 41 is configured to provide electrical energy to the electronic candle. The charging module 42 is configured to obtain electrical energy (e.g., by means of a wireless charging coil provided at the tray to charge the energy storage module 41). In some embodiments, the energy storage module 31 is a rechargeable battery. In some embodiments, the electronic candle further includes a display module 43 that is electrically connected to the energy storage module 41 for displaying the electricity quantity of the energy storage module 41. In some embodiments, the external power interface is a Type-C interface. In an embodiment, the body is provided with a power switch. The power switch is connected between the wireless charging circuit and the external power interface to connect or disconnect the wireless charging circuit with the external power interface. In an embodiment, the power switch is a touch key switch.

FIG. 25B illustrates a schematic structural view of another electronic candle in accordance with one or more embodiments of the present technology. The electronic candle further includes a flame simulation unit 21 and a main control unit 35 for controlling the flame simulation unit 21. The main control unit 35 includes a time calculating unit 36 and a timing unit 37. The time calculating unit 36 is configured to provide time calculating parameter information to the main control unit 35. The timing unit 37 is configured to provide timing parameter information to the main control unit 35. At least one of a turn-on time and a turn-off time of the flame simulation unit 21 is controlled by the main control unit 35 according to the acquired time calculating parameter information and timing parameter information. The turn-on time, turn-off time, and/or other timing information can be displayed by the display module 43.

Figure 26:
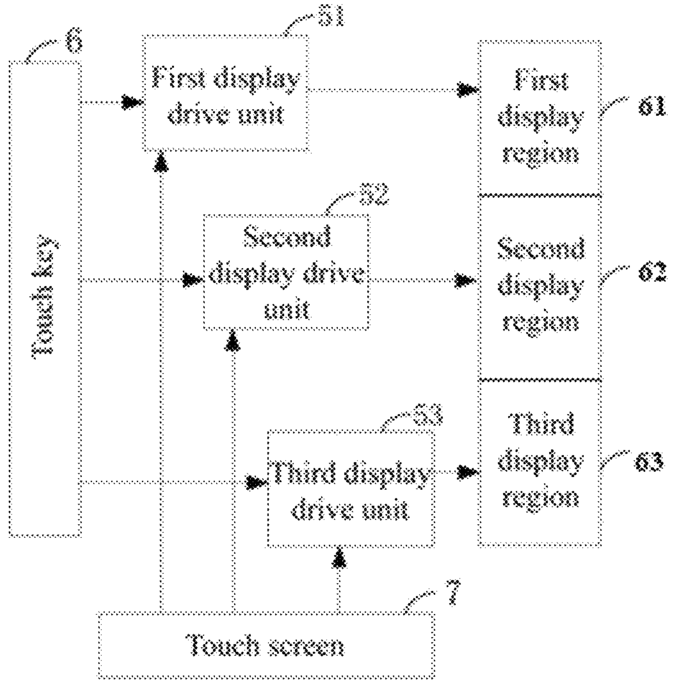
FIG. 26 illustrates a schematic diagram of an example curved screen of an electronic candle in accordance with one or more embodiments of the present technology.

FIG. 26 illustrates a schematic diagram of an example curved screen of an electronic candle in accordance with one or more embodiments of the present technology. In some embodiments, the side surface of the electronic candle includes a curved screen. The curved screen includes a first display region 61, a second display region 62 and a third display region 63. The first display region 61, the second display region 62, and the third display region 63 are each configured to display a part of a scene (e.g., an anniversary scene interface, a birthday celebration scene, and/or a festival celebration scene). In some embodiments, the curved screen covers all of the side surface. In some embodiments, a first display drive unit 51, a second display drive unit 52, and a third display drive unit 53 are further provided in the housing. The first display drive unit 51 is configured to drive the first display region 61 to display a first scene (e.g., an anniversary scene) in response to a first scene switching electrical signal. The second display drive unit 52 is configured to drive the second display region 62 to display a second scene (e.g., a birthday celebration scene) in response to a second scene switching electrical signal. The third display drive unit 53 is configured to drive the third display region 63 to display a third scene (e.g., the festival celebration scene) in response to a third scene switching electrical signal.

In some embodiments, a touch key 6 is positioned on the upper top surface 1 of the housing. The touch key 6 is connected to the first display drive unit 51, the second display drive unit 52 and/or the third display drive unit 53 to send the scene switching electrical signal(s) to the first display drive unit 51, the second display drive unit 52, and/or the third display drive unit 53. In some embodiments, at least part of the curved screen is a touch screen. The touch screen 7 is connected to the first display drive unit 51, the second display drive unit 52 and the third display drive unit 53 to send the scene switching electrical signal(s) to the first display drive unit 51, the second display drive unit 52, and/or the third display drive unit 53. In some embodiments, the entire curved screen is the touch screen 7.

Figure 27:
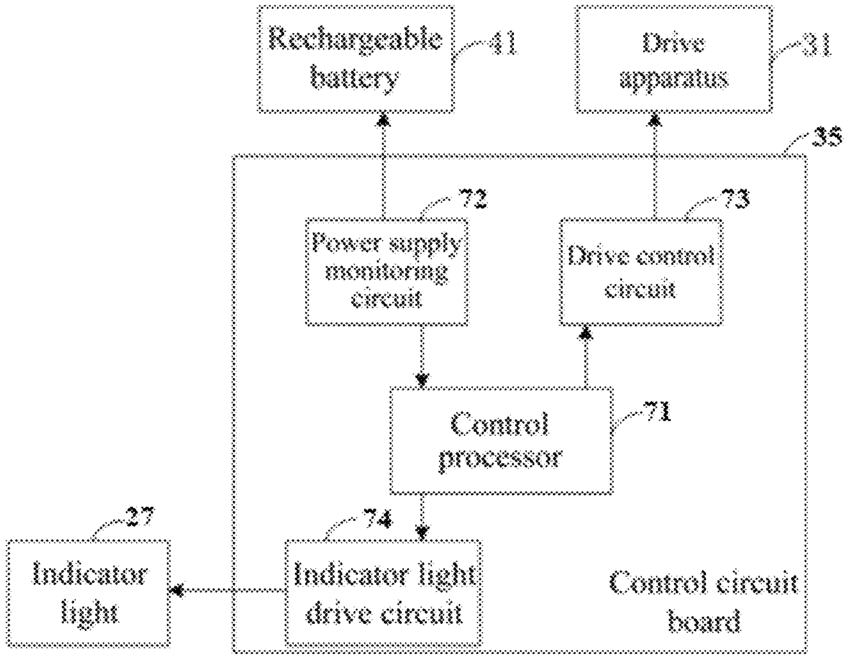
FIG. 27 illustrates example components of a control circuit board of an electronic candle in accordance with one or more embodiments of the present technology.

FIG. 27 illustrates example components of a control circuit board of an electronic candle in accordance with one or more embodiments of the present technology. In some embodiments, the cavity of the housing of the electronic candle includes a control circuit board as its main control unit. The control circuit board includes a control processor 71, a power supply monitoring circuit 72, and a drive control circuit 73. The power supply monitoring circuit 72 is electrically connected to the control processor 71 and the rechargeable battery 41, respectively. The power supply monitoring circuit 72 is configured to monitor a power parameter of the rechargeable battery 41 and send the power parameter acquired by monitoring to the control processor 71. The control processor 71 is connected to the drive control circuit 73 and is configured to send a charging required control signal to the drive control circuit 53 when the power parameter of the rechargeable battery 41 is not greater than a preset threshold value. The drive control circuit 73 is connected to the drive apparatus 31. The drive control circuit 73 is configured to send, in response to the charging required control signal, a drive control signal to the drive apparatus 31 to separate the housings. The drive apparatus 31 is configured to, in response to the drive control signal, separates the upper housing body and the lower housing body via the extendable and retractable apparatus 32 to expose the external power supply interface 25 to the outside.

In some embodiments, the control processor 71 is further configured to send a termination of charging signal to the drive control circuit 73 when the power parameter of the rechargeable battery 41 is greater than a preset threshold value and no external power supply is connected to the external power supply interface 25. The drive control circuit 73 is further configured to send, in response to the termination signal, send a drive control signal to the drive apparatus 31. The drive apparatus 31 is further configured to, in response to the drive control signal, pull the upper housing body and the lower housing body together via the extendable and retractable apparatus 32 to hide the external power supply interface 25.

In some embodiments, the external power supply interface 25 includes an indicator light 27. The control circuit board includes an indicator light drive circuit 74 that is connected to the control processor 71 and the indicator light 27 respectively. The control processor 71 is further configured to send an indicator light color control signal to the indicator light drive circuit 74 based on the power parameter of the rechargeable battery 41. The indicator light drive circuit 74 is configured to control the light color of the indicator light 27 in response to the indicator light color control signal.

In some embodiments, the upper housing body or the lower housing body includes a touch switch that is connected to the control processor 71. When the upper housing body and the lower housing body are coupled and connected, the touch switch is configured to send an active charging signal to the control processor 71 in response to a touch action. The control processor 71 is configured to, in response to the active charging signal, send a charging required control signal to the drive control circuit 53 to expose the external power supply interface 25 to the outside. In some embodiments, when the upper housing body and the lower housing body are separate, the touch switch is further configured to, in response to a touch action, send a forced end signal to the control processor 71. The control processor 71 is configured to, in response to the forced end signal, send a drive control signal to the drive control circuit 73 to hide the external power supply interface 25. In some embodiments, the external power supply interface is a type-C interface. In some embodiments, the rechargeable battery includes a lithium battery. In some embodiments, the rechargeable battery is an 18650 battery. In some embodiments, after being filled with wax, the size of the housing of the electronic candle is approximately 3.5×5 inches. In some embodiments, the rechargeable battery is fully charged within 3 h to 4 h. In some embodiments, when the battery is fully charged, the charge indicator light turns white. The charge indicator light remains red during charging.

Heating Simulation and Fan

Figure 28:
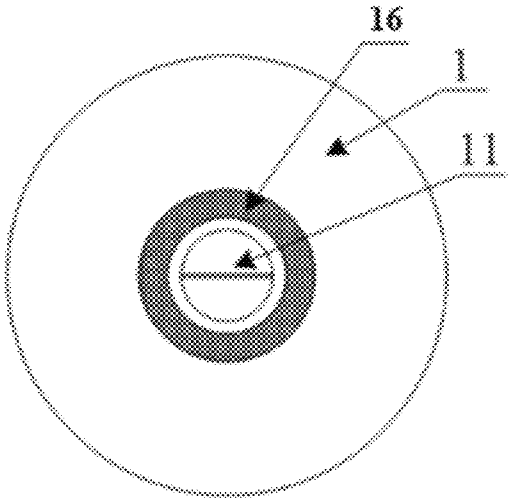
FIG. 28 illustrates a top view of an example electronic candle in accordance with one or more embodiments of the present technology.
Figure 29:
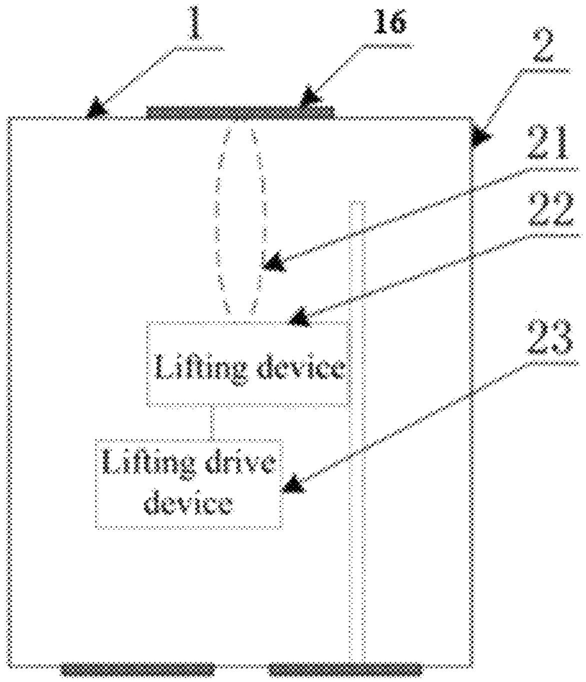
FIG. 29 illustrates a side view of the example electronic candle in FIG. 28 in accordance with one or more embodiments of the present technology.
Figure 30:
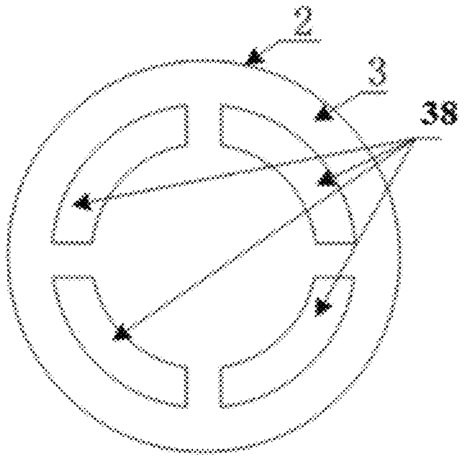
FIG. 30 illustrates a bottom view of the example electronic candle in FIG. 28 in accordance with one or more embodiments of the present technology.

FIGS. 28-30 illustrate a top view, a side view, and a bottom view of an example electronic candle in accordance with one or more embodiments of the present technology. The electronic candle comprises a cylindrical housing. A cavity is formed within the housing. The housing comprises an upper housing top surface 1 that includes an opening 11, a bottom surface 3 and a side surface 2. An annular heating device 16 is positioned close to the opening 11. A flame simulation apparatus 21, a lifting apparatus 22, and a lifting drive apparatus 23 are positioned within the cavity. The lifting drive apparatus 23 is connected to the lifting apparatus 22 to provide the lifting apparatus 22 with a driving force. The lifting apparatus 22 is connected to the flame simulation apparatus 21 to lift the flame simulation apparatus 21 from the opening 11 of the upper housing top surface 1 when driving force provided by the lifting drive apparatus 23 is acquired. The flame simulation apparatus 21 is used to simulate a candle flame after being lifted from the flame opening 11.

Figure 31:
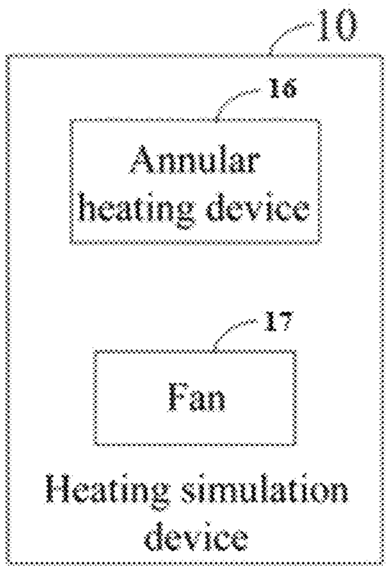
FIG. 31 illustrates a block diagram of example structures in a heating simulation apparatus in accordance with one or more embodiments of the present technology.
Figure 32:
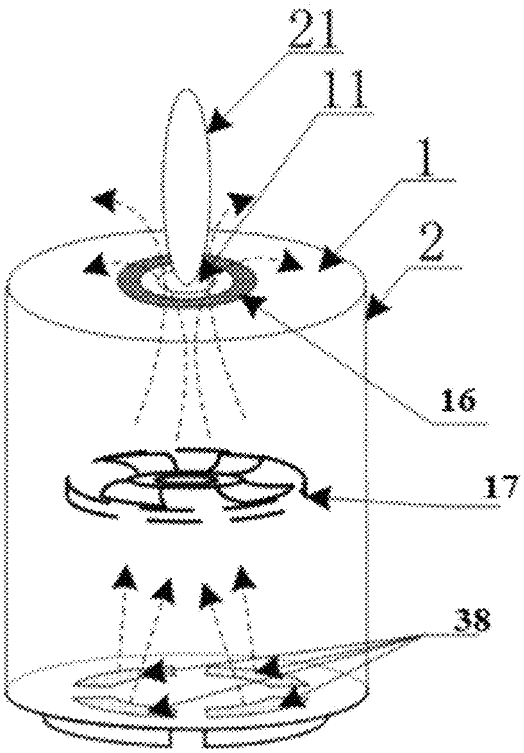
FIG. 32 illustrates an example heating simulation apparatus with a fan in accordance with one or more embodiments of the present technology.

In some embodiments, the electronic candle further comprises a heating simulation device. FIG. 31 illustrates a block diagram of example structures in a heating simulation device 10 in accordance with one or more embodiments of the present technology. The heating simulation device 10 comprises an annular heating device 16. The annular heating device 16 is provided on the edge of the flame opening 11 of the upper housing top surface 1. The annular heating device 16 radiates heat energy outward to simulate the temperature of the candle flame. In some embodiments, the annular heating device 16 includes a heating wire. In some embodiments, the heating simulation device 10 further comprises a fan 17 that is positioned within the cavity. As shown in FIG. 30 and FIG. 32, the bottom surface 3 of the housing includes one or more vents 38 such that the heated air within the cavity can be discharged into the external environment. In some embodiments, a heating temperature value of the annular heating apparatus 16 is positively correlated with the brightness of a candle flame simulated by the flame simulation apparatus 21. The higher the brightness of the candle flame simulated by the flame simulation apparatus 21, the higher the heating temperature value of the annular heating apparatus 16. In some embodiments, a rotational speed of the fan 17 is positively correlated with the brightness of the candle flame simulated by the flame simulation apparatus. The higher the brightness of the candle flame simulated by the flame simulation apparatus 21, the greater the rotational speed of the fan 17.

Figure 33:
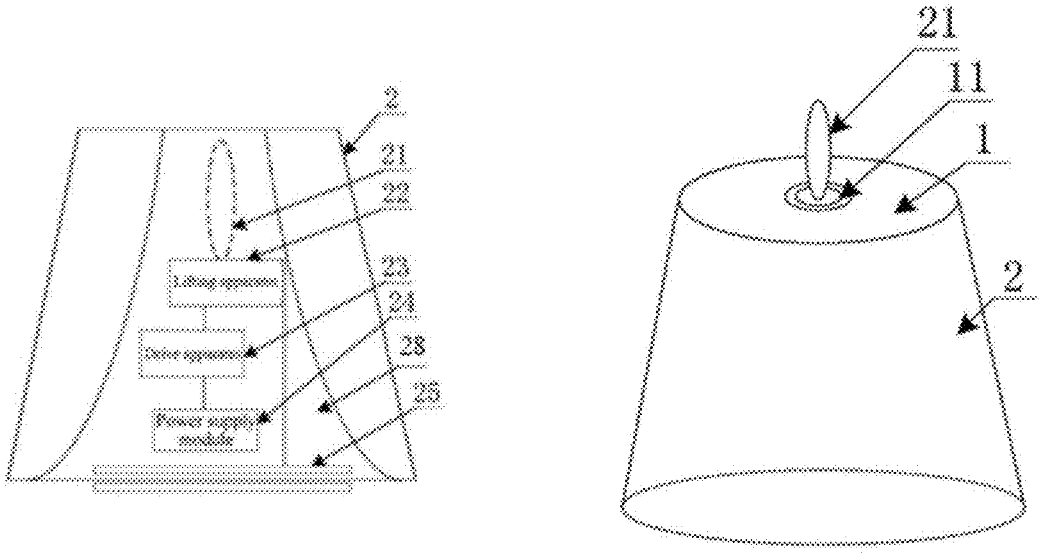
FIG. 33 illustrates a side view and a perspective view of an example electronic candle in accordance with one or more embodiments of the present technology.

FIG. 33 illustrates a side view and a perspective view of an example electronic candle in accordance with one or more embodiments of the present technology. In this example, the electronic candle has an air quality monitoring function. The electronic candle includes a truncated conical housing. The housing includes a bottom surface 3 and a side surface 2. The upper bottom surface 1 is provided with a flame piece opening 11, and the side surface 2 is provided with a display screen. A flame simulating apparatus 21, a lifting apparatus 22, a drive apparatus 23, and a power supply module 24 are provided in the housing. The power supply module 24 is connected to the drive apparatus 23. The power supply module 24 is configured to provide power to the drive apparatus 23. The drive apparatus 23 is connected to the lifting apparatus 22 to provide a driving force to the lifting apparatus 22. The lifting apparatus 22 is connected to the flame simulating apparatus 21 and is configured to list the flame simulating apparatus 21 from the flame piece opening when the driving force is acquired. The flame simulating apparatus 21 is configured to simulate a candle flame after being lifted from the flame piece opening 11. The interior of the housing has a horn-shaped cavity 28. A narrow mouth of the horn-shaped cavity 28 is located at the flame piece opening 11, and a wide mouth of the horn-shaped cavity 28 is located on the lower bottom surface 3.

Figure 34:
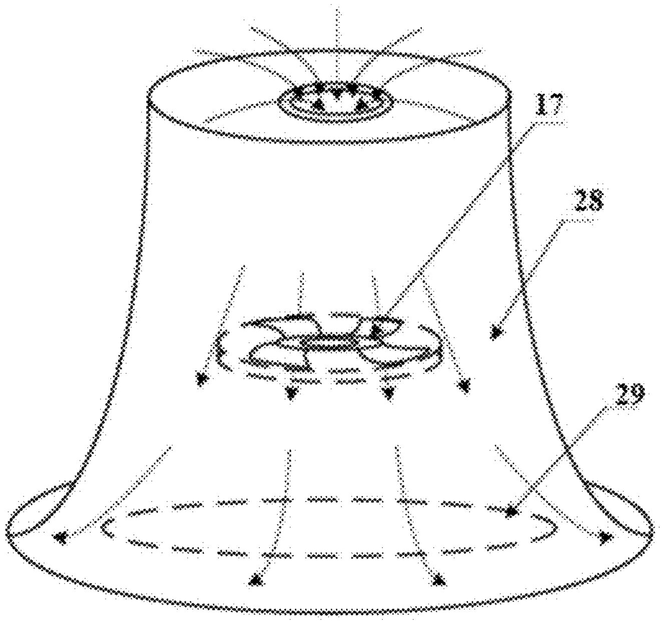
FIG. 34 illustrates an example horn-shaped cavity of an electronic candle in accordance with one or more embodiments of the present technology.

FIG. 34 illustrates an example horn-shaped cavity of an electronic candle in accordance with one or more embodiments of the present technology. A fan 17 and an air testing module 29 are provided in the horn-shaped cavity 28. The fan 17 is configured to direct indoor air from the narrow mouth of the horn-shaped cavity 28 and discharging the indoor air from the wide mouth of the horn-shaped cavity 28. In some embodiments, the air testing module 29 includes a testing motherboard and a plurality of sensor arrays. The testing motherboard is disposed at the wide mouth of the horn-shaped cavity 28 and is parallel to a plane in which an inner edge of the wide mouth of the horn-shaped cavity 28 is located.

Figure 35:
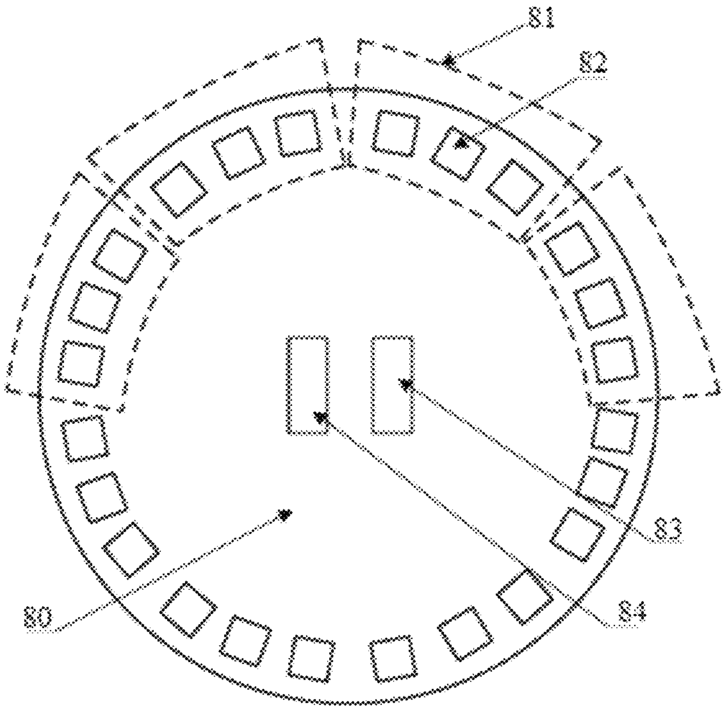
FIG. 35 illustrates an example air testing module of an electronic candle in accordance with one or more embodiments of the present technology.

FIG. 35 illustrates an example air testing module of an electronic candle in accordance with one or more embodiments of the present technology. The plurality of sensor arrays 81 is configured to measure a parameter of the indoor air. The plurality of sensor arrays 81 is disposed on the testing motherboard 80. The sensors are evenly and symmetrically arranged on the inner edge of the wide mouth of the horn-shaped cavity, such that when the indoor air is discharged from the wide mouth of the horn-shaped cavity, the indoor air uniformly passes through the sensor arrays 81. The testing motherboard 80 is electrically connected to the display screen. The display screen is configured to display the parameter value of the indoor air. In some embodiments, the testing motherboard 80 has a circular shape, and the plurality of sensor arrays 81 are evenly and symmetrically arranged on the edge of the testing motherboard 80. In some embodiments, each sensor array 81 includes a sensor unit 82. The sensor unit 82 can be a PM2.5 sensor, a temperature and humidity sensor, a carbon dioxide sensor, a Total Volatile Organic Compounds (TVOC) sensor, a negative oxygen ion sensor, and/or a formaldehyde sensor. In some embodiments, the sensor array 81 also includes an ambient temperature sensor 83 and/or a humidity sensor 84 disposed in a middle portion of the testing motherboard for measuring the temperature and/or humidity of the indoor air.

Figure 36:
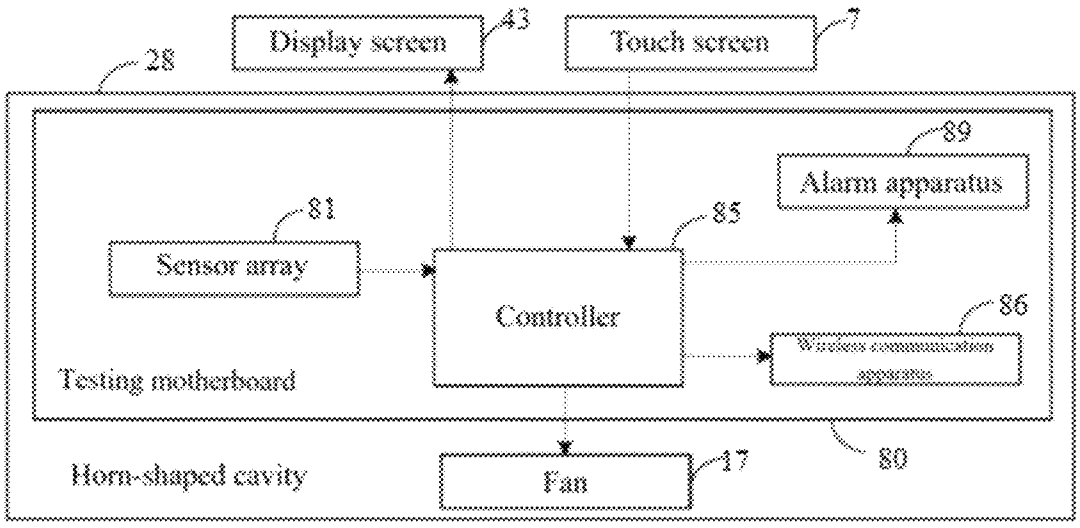
FIG. 36 is a block diagram of an example testing motherboard of an electronic candle in accordance with one or more embodiments of the present technology.

FIG. 36 is a block diagram of an example testing motherboard of an electronic candle in accordance with one or more embodiments of the present technology. The testing motherboard 80 includes a controller 85 that is connected to each sensor array 81 to acquire data of each sensor unit 82 in each sensor array 81 and average the data of the same sensor unit 82 to obtain the parameter of the indoor air. In some embodiments, the testing motherboard 80 includes a wireless communication apparatus 86 configured to communicate the parameter of the indoor air to a mobile terminal and/or a cloud server. In some embodiments, the wireless communication apparatus 86 includes a Wi-Fi module and/or a Zigbee module. In some embodiments, the controller 85 is connected to a display module 43 that is configured to display the parameter value of the indoor air. In some embodiments, the display module 43 includes a curved screen. In some embodiments, the testing motherboard 80 includes an alarm apparatus 89 connected to the controller 85. The alarm apparatus is configured to issue an alarm when the parameter of the indoor air triggers an alarm condition. In some embodiments, the electronic candle further includes a touch screen 7 electrically connected to the controller 85, configured to shut down and start the testing motherboard 80 after being triggered by a user. In some embodiments, at least part of the display screen 43 includes the touch screen 7. In some embodiments, the touch screen is disposed above the display screen 43.

Mode Switching of the Electronic Candle

Figure 37:
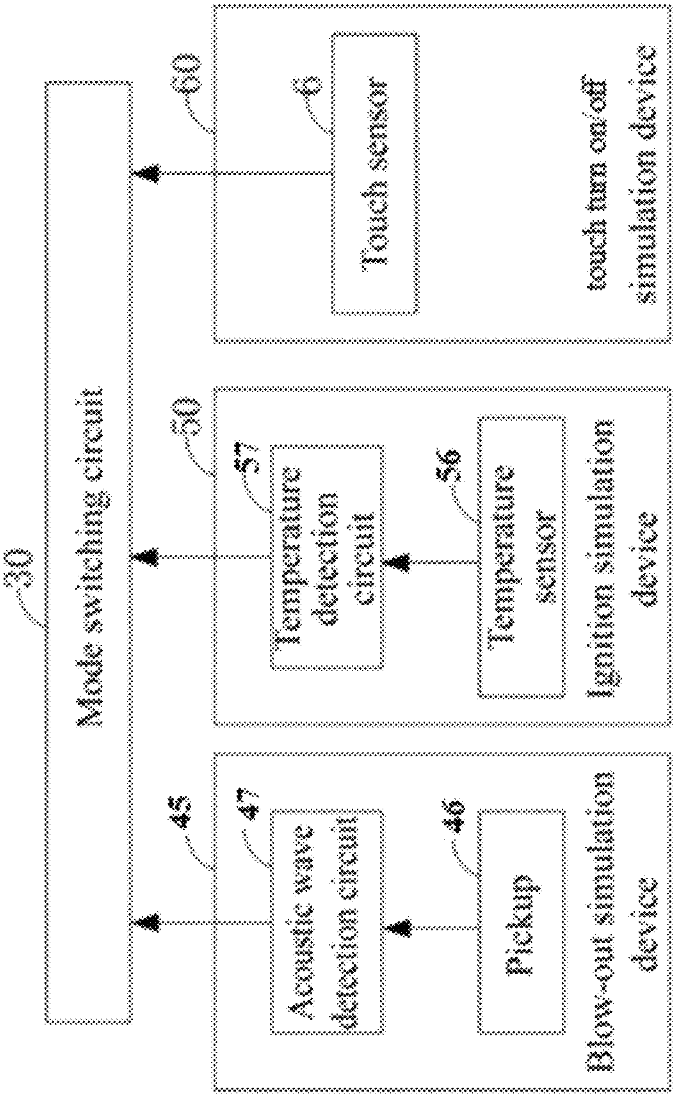
FIG. 37 illustrates an example framework of a mode switching function of an electronic candle in accordance with one or more embodiments of the present technology.

FIG. 37 illustrates an example framework of a mode switching function of an electronic candle in accordance with one or more embodiments of the present technology. In some embodiments, the electronics candle further comprises a blow-out simulation apparatus 45 and a mode switching circuit 30. The mode switching circuit 30 is positioned within the cavity to control the electronic candle (e.g., to switch to a candle burning mode or a candle extinguishing mode). The candle burning mode is a mode in the flame simulation apparatus extends out of the flame opening such that the electronic candle simulates a burning state of a real candle. The candle extinguishing mode is a mode in which a wick model extends out of the flame opening such that the electronic candle simulates an extinguished state of a real candle.

In some embodiments, the blow-out simulation apparatus 45 includes a pickup module 46 and an acoustic wave detection circuit 47. The pickup 46 can be positioned on the upper housing top surface 1 of the housing to collect an acoustic wave signal generated by a blow-out action, convert the collected acoustic wave signal into an acoustic wave electrical signal, and send the signal to the acoustic wave detection circuit 47. The acoustic wave detection circuit 47 can be positioned within the cavity and is electrically connected to the mode switching circuit 30. The acoustic wave detection circuit 47 amplifies the acoustic wave electrical signal by a preset magnification factor. When the amplitude of the amplified acoustic signal is greater than a preset amplitude value and for a continuous duration that is greater than a preset duration, a blow-out signal is transmitted to the mode switching circuit 30 to switch the electronic candle to the candle extinguishing mode.

Figure 38:
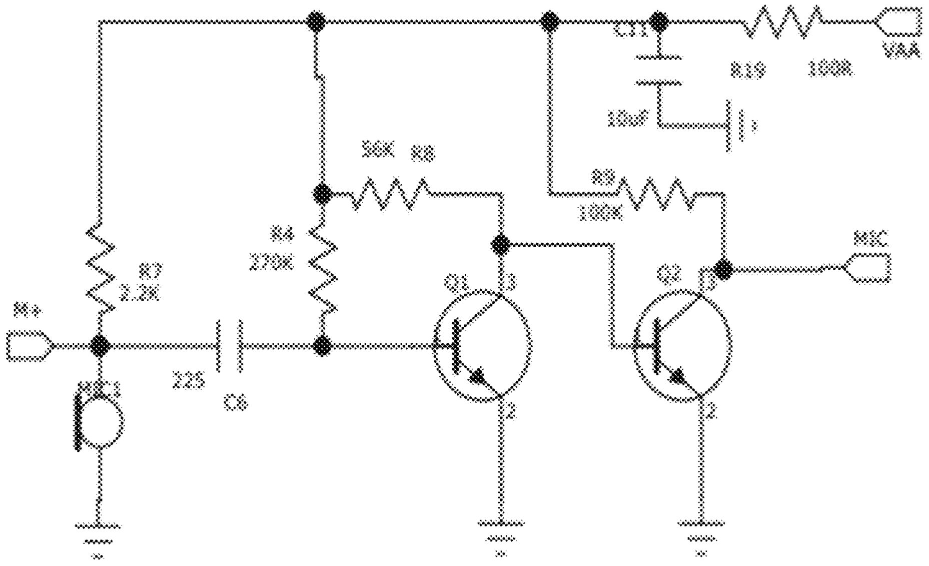
FIG. 38 is a schematic diagram of an example circuit structure of an acoustic wave detection circuit in accordance with one or more embodiments of the present technology.

FIG. 38 is a schematic diagram of an example circuit structure of an acoustic wave detection circuit in accordance with one or more embodiments of the present technology. When blowing air on a pickup (e.g., a microphone), an acoustic wave signal generated by airflow is acquired by the pickup MIC to generate an analog acoustic wave electric signal. The acoustic wave electric signal is coupled by a capacitor C6, and then amplified by a triode Q1 and a triode Q2. When the continuous duration of the amplified acoustic wave electric signal is substantially similar to a rectangular square wave that lasts greater than 50 uS, a blow-out signal is sent to the mode switching circuit 30 so as to switch the electronic candle to the candle extinguishing mode. A resistor R7 is a power supply resistor of the pickup MIC, a resistor R4, a resistor R8 and a resistor R9 are power supply resistors of the triode Q1 and the triode Q2, and a resistor R19 and a capacitor C11 are a filter circuit, jointly forming an acoustic wave detection circuit.

Figure 39:
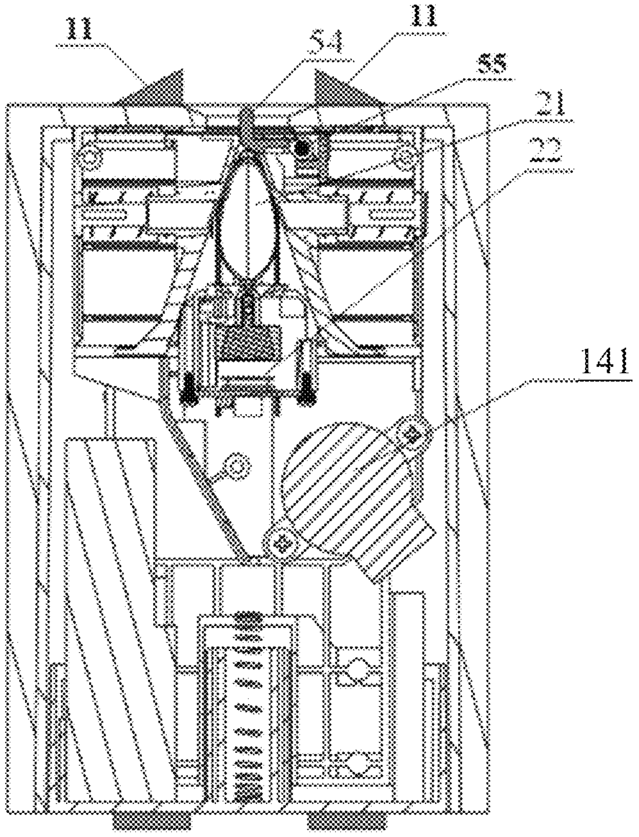
FIG. 39 illustrates a cross-sectional schematic view of a center of an example electronic candle in accordance with one or more embodiments of the present technology.

FIG. 39 illustrates a cross-sectional schematic view of a center of an example electronic candle in accordance with one or more embodiments of the present technology. The electronic candle further includes a wick simulation apparatus. In some embodiments, the wick simulation apparatus comprises a wick 54 (e.g., a cotton wick) and a wick reset apparatus 55 that is positioned within the cavity. The wick reset apparatus 55 is configured to lift the cotton wick 54 from the flame opening of the upper candle surface when the electronic candle is in the candle extinguishing mode to simulate a real wick when the candle is not burning.

Figure 40C:
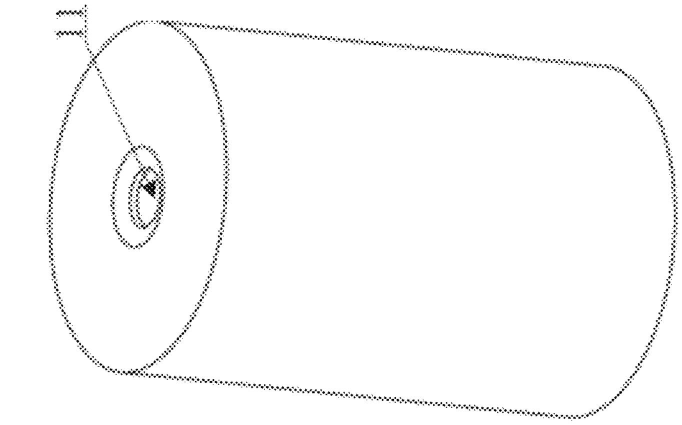
FIG. 40C illustrates the example electronic candle in a shutdown state in accordance with one or more embodiments of the present technology.
Figure 40B:
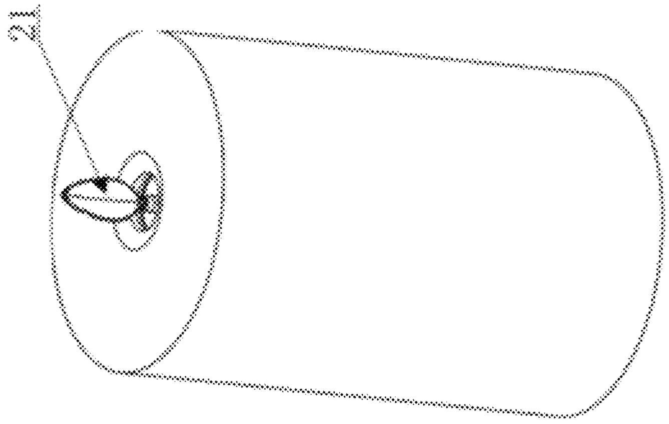
FIG. 40B illustrates the example electronic candle in a candle burning mode in accordance with one or more embodiments of the present technology.
Figure 40A:
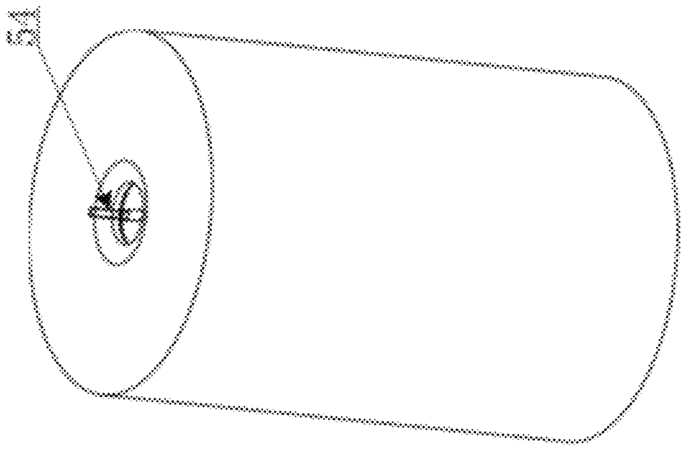
FIG. 40A illustrates an example electronic candle in an extinguished mode in accordance with one or more embodiments of the present technology.

FIGS. 40A-C illustrate an example candle in the extinguished mode, a burning mode, and a shutdown state respectively. When the electronic candle is in the extinguished mode, the cotton wick 54 is lifted from the flame opening (shown in FIG. 40A). When the electronic candle is in the candle burning mode, the flame simulation apparatus 21 is lifted from the flame opening (shown in FIG. 40B). When the electronic candle is shut down, the flame opening 11 is closed (shown in FIG. 40C).

Referring back to FIG. 37, in some embodiments, the electronic candle further comprises an ignition simulation apparatus 50 to simulate an ignition process of the candle. The ignition simulation apparatus 50 comprises a temperature sensor 56 and a temperature detection circuit 57. The temperature sensor 56 can be positioned on the cotton wick 54 to monitor the temperature of the cotton wick 54. The temperature sensor 56 can send a temperature value to the temperature detection circuit 57. The temperature detection circuit 57 is connected to the mode switching circuit 30 to send a wick ignition electrical signal to the mode switching circuit 30 when the temperature value of the cotton wick 54 is greater than a preset temperature value. The mode switching circuit 30 is further configured to switch the electronic candle to a different mode in response to the signal.

In some embodiments, the electronic candle further comprises a touch turn-on/off simulation device 60. The touch turn-on/off simulation device 60 comprises a touch sensor 6. The side surface of the simulation housing can include a touch region in which the touch sensor 6 is positioned. The touch sensor 6 is connected to the mode switching circuit 30 to send an electrical signal when the touch region is touched by the user. The mode switching circuit 30 is further used to switch the electronic candle to a different mode in response to the electrical signal from the touch sensor.

Figure 41:
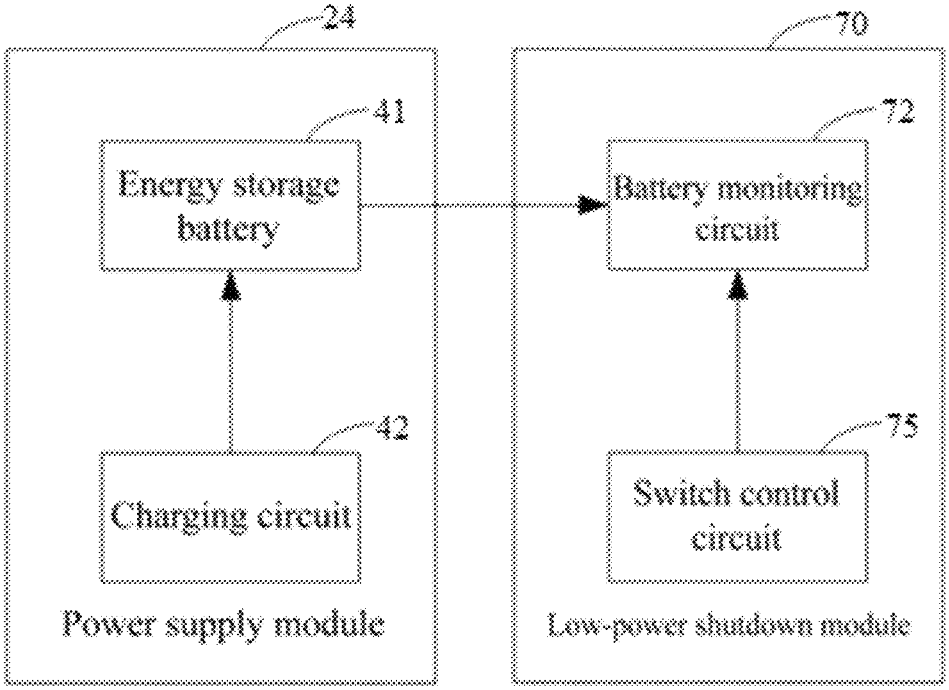
FIG. 41 illustrates an example power supply of an electronic candle in accordance with one or more embodiments of the present technology.

FIG. 41 illustrates an example power supply of an electronic candle in accordance with one or more embodiments of the present technology. The electronic candle comprises a power supply module 24 that is configured to provide the electronic candle with electrical energy. In some embodiments, the power supply module 24 comprises an energy storage battery 41 and a charging circuit 42. The charging circuit 42 is configured to charge the energy storage battery 41. In some embodiments, the electronic candle further comprises a low-power shutdown module 70. The low-power shutdown module 70 comprises a battery monitoring circuit 72 and a switch control circuit 75. The battery monitoring circuit 72 is configured to monitor an electric quantity parameter of the energy storage battery and send an electric quantity parameter value to the switch control circuit 75. The switch control circuit 75 is configured to turn off the electronic candle or switch the electronic candle to a shutdown state when the electric quantity parameter value is less than a preset minimum value. The switch control circuit 75 is further configured to turn on the electronic candle or switch the electronic candle to a standby state when the electric quantity parameter value is greater than a preset maximum value. In some embodiments, the energy storage battery is powered by a 18650 2000 mAH/3.7 V lithium battery. The charging circuit 42 is configured to externally connect an external charging power supply of 5 V/1 A or 5 V/2 A to charge the energy storage battery. The external charging power supply can be an input via a USB socket interface. In some embodiments, a charging current is 1A for safety concerns. In some embodiments, the charging circuit 72 also comprises an LED indicator light that remains red during charging and turns green when fully charged.

Figure 42A:
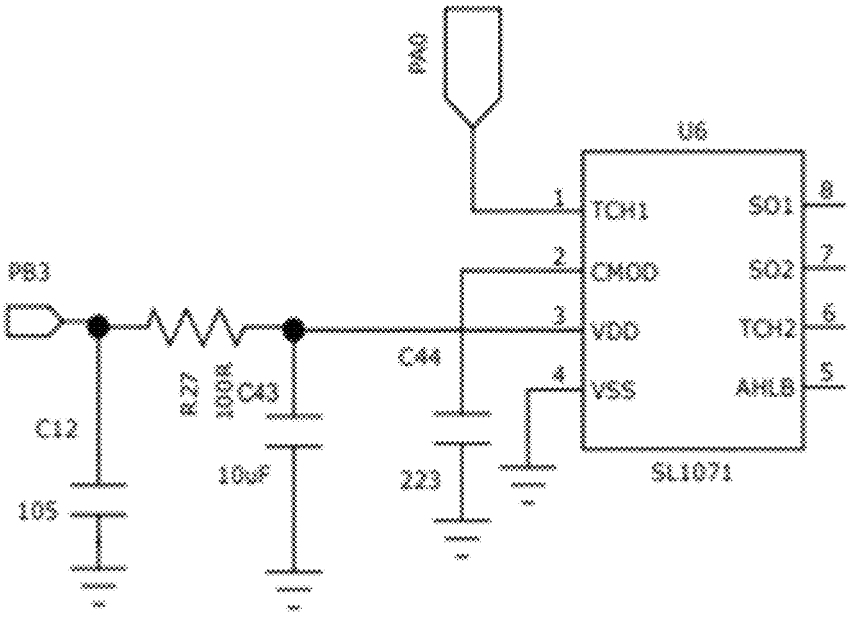
FIG. 42A is a schematic diagram of the circuit connection of a touch sensor in accordance with one or more embodiments of the present technology.
Figure 42B:
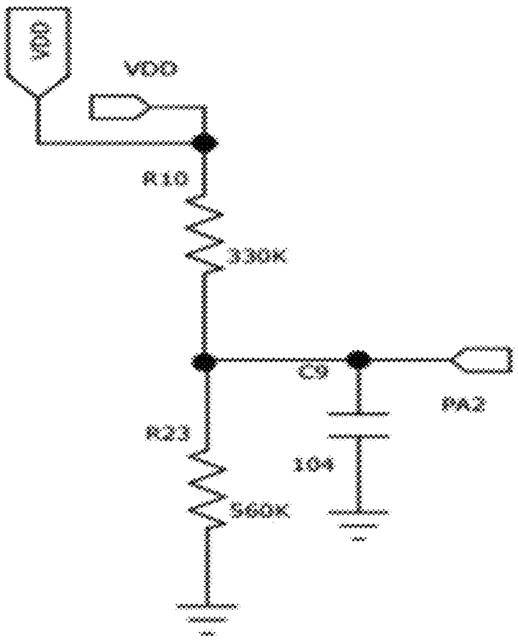
FIG. 42B is a circuit schematic diagram of a battery monitoring circuit in accordance with one or more embodiments of the present technology.

FIG. 42A is a schematic diagram of the circuit connection of a touch sensor in accordance with one or more embodiments of the present technology. In some embodiments, a PAO touch line, a capacitor C12, a capacitor C43 and a resistor R27 form a filter circuit to supply power to a touch chip U6. A capacitor C44 is a capacitor for adjusting touch sensitivity. A pin SO1 of the touch chip U6 is configured to output the gripping-and-lighting electrical signal. FIG. 42B is a circuit schematic diagram of a battery monitoring circuit in accordance with one or more embodiments of the present technology. In some embodiments, the battery monitoring circuit comprises a battery voltage connection terminal VDD, a switch control circuit connection terminal PA2, a resistor R10, a resistor R23 and a capacitor C9. In some embodiments, when the voltage of the battery is lower than 3.4 V, all functions of the electronic candle are turned off. The standby state is not restored until the charge of the rechargeable battery meets a normal power-on voltage.

Driving Mechanisms

Figure 43:
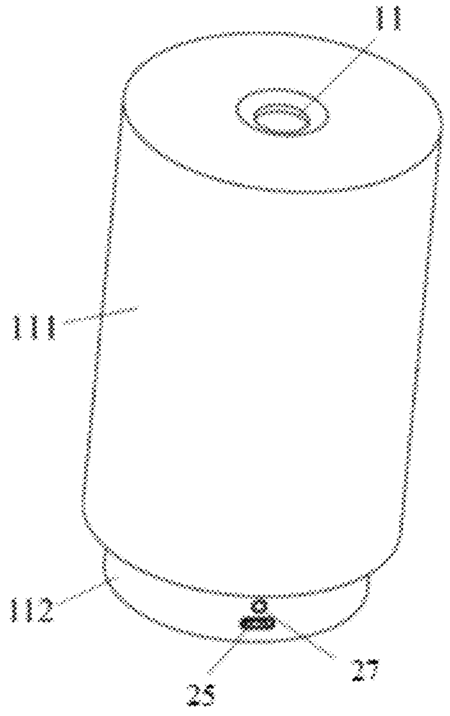
FIG. 43 is a three-dimensional view of an example electronic candle in accordance with one or more embodiments of the present technology.
Figure 44:
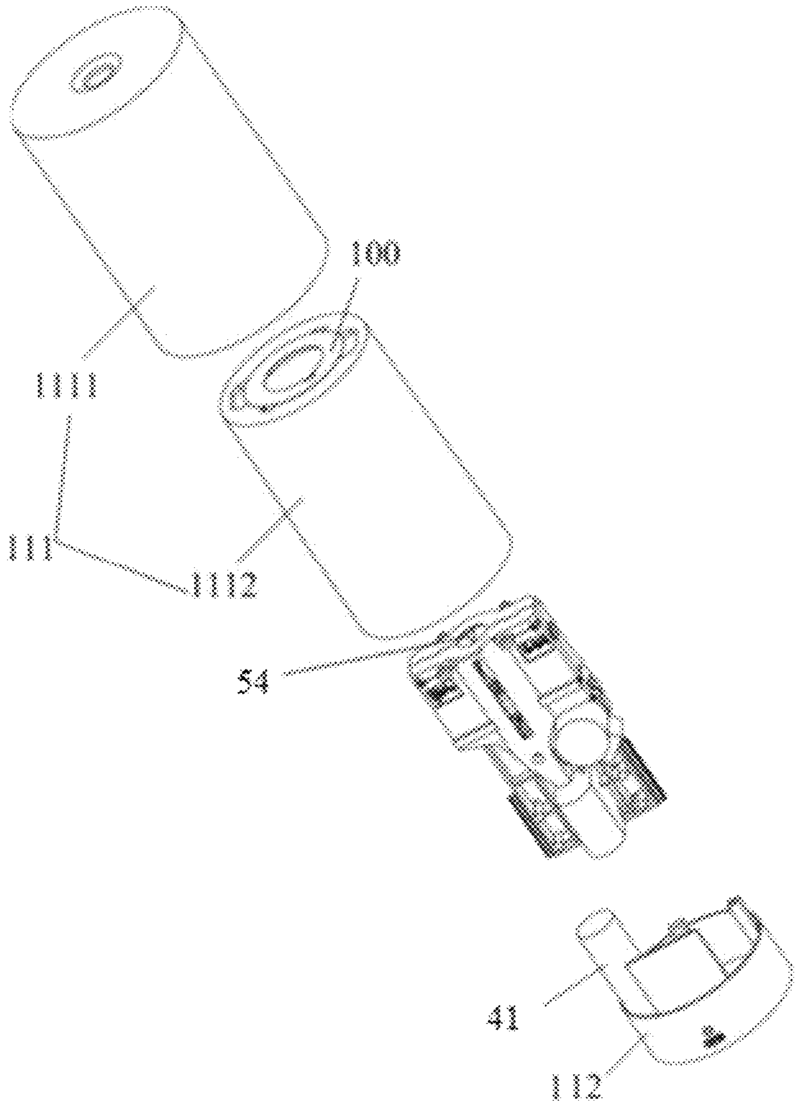
FIG. 44 illustrates an exploded view of an example electronic candle in accordance with one or more embodiments of the present technology.

Referring to FIGS. 43-44, the candle main body includes a candle body 111 and a base 112. The candle body 11 comprises a candle tube 1111 and an inner tube 1112. The candle tube 1111 is sleeved on an outer wall of the inner tube 1112 and can be connected thereto in an adhesive manner. The above internal cavity 1113 is the interior of the inner tube 1112. The sensing element 100 that acquires the touch signal or the pressure signal is disposed between the candle tube 1111 and the inner tube 1112.

Figure 45:
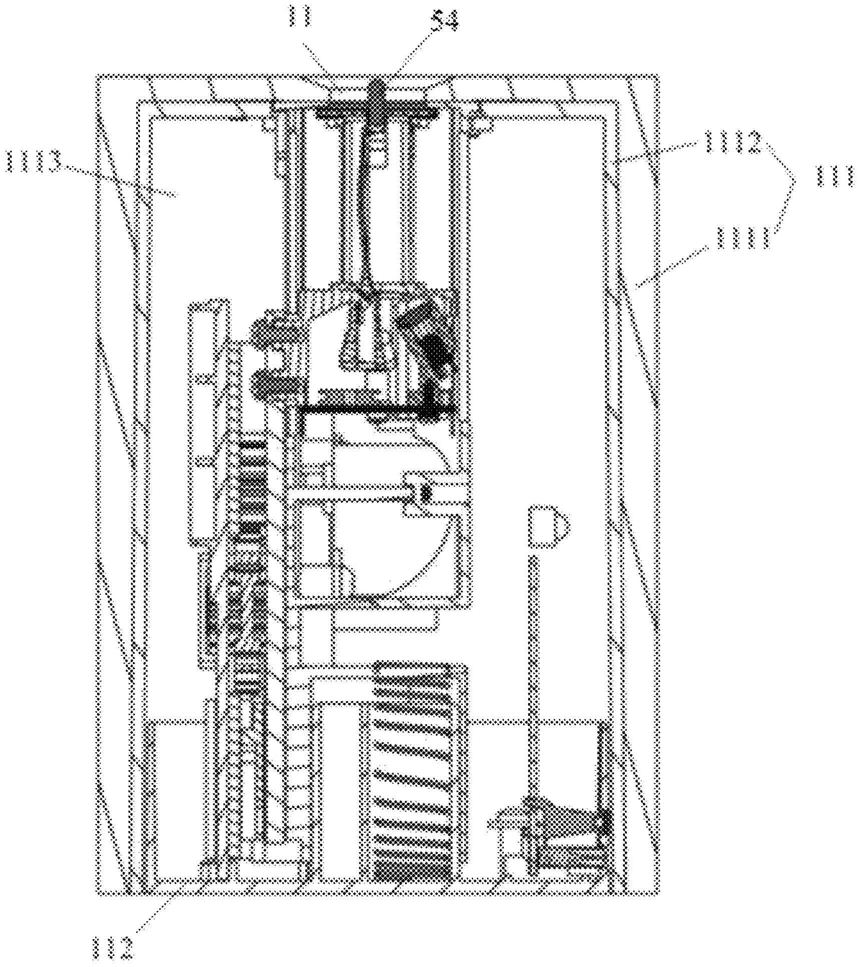
FIG. 45 illustrates a cross sectional view of an example electronic candle in accordance with one or more embodiments of the present technology.

FIG. 45 illustrates a cross sectional view of an example electronic candle in accordance with one or more embodiments of the present technology. The candle body 111 includes, at one end thereof, an inwardly formed internal cavity 1113 having an opening. The candle body 111 includes, at the other end thereof, an opening or an access hole 11 that leads to the internal cavity 1113. The candle body 111 can be sleeved on the outer side of the base 112.

Figure 46:
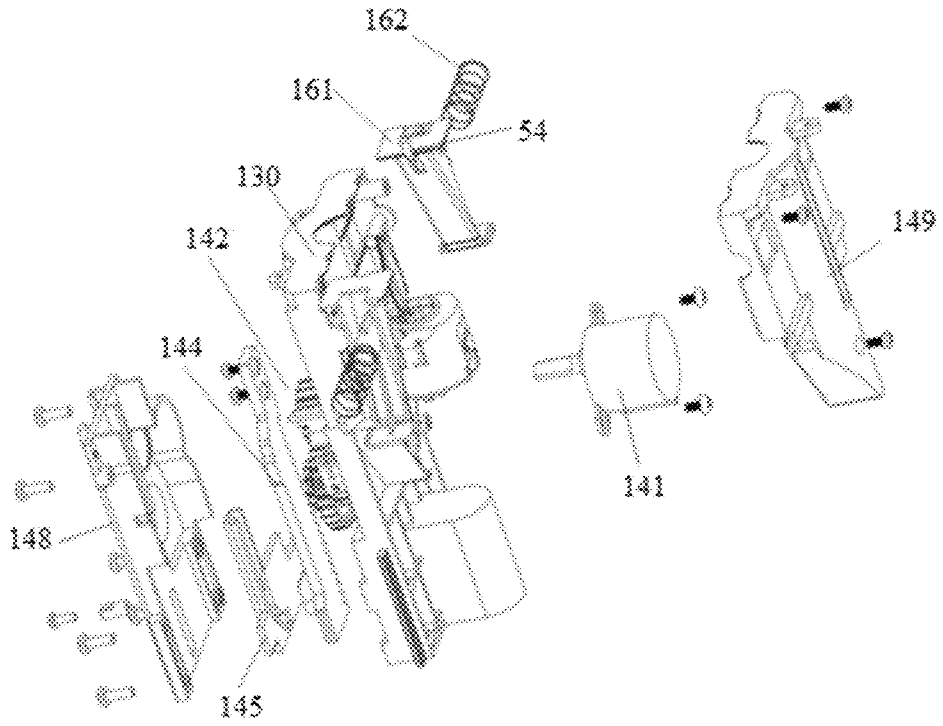
FIG. 46 illustrates another exploded view of an example electronic candle in accordance with one or more embodiments of the present technology.

FIG. 46 illustrates another exploded view of an example electronic candle in accordance with one or more embodiments of the present technology. A mounting cavity is bounded by the candle body 111 and the base 112. The rechargeable battery 41, the frame 130, the driving mechanism, and the closing mechanism are all disposed in the mounting cavity. In some embodiments, the mounting cavity is the internal cavity 1113 of the candle body 111, and the candle body 111 is sleeved on the outer side of the base 112 from the opening thereof. In some embodiments, the internal cavity 1113 of candle body 111 can accommodate the base 112, and as the candle body 111 is sleeved on the outer side of the base 112. The candle body 111 and the base 112 can be side fitted together. The candle body 111 has a structure that simulates of a real candle, e.g., a cylindrical shape. Moreover, the effect produced by melted wax flowing downward and solidifying along the exterior of the real candle at a high temperature after burning of the real candle may be present on the exterior (outer wall) of the candle body 111. In some embodiments, the candle body 111 looks like a real candle with a hollow interior, or an imitation that is made very close to the real candle in terms of hand feel and senses.

The base 112 is provided with a charge port 25 (as shown in FIG. 43) connected to the rechargeable battery 41. The charge port can be connected to an external power supply through a charge cable to charge the rechargeable battery 41. The rechargeable battery 41, the candle flame light-emitting assembly 21, and the driving mechanism are all connected to the control module. The rechargeable battery 41 is configured to provide a power supply to the candle flame light-emitting assembly 21 and the driving mechanism. The candle flame light-emitting assembly 21 includes a sheet structure that simulates a real candle flame. The candle flame light-emitting assembly 21 can emit light similar to that of the real candle under the action of power provided by the rechargeable battery and can simulate a shape of the real candle flame. In some embodiments, the candle flame light-emitting assembly 21 can also be of other shapes, which are not limited herein. The frame 130 is slidably disposed in the mounting cavity. In some embodiments, the frame 130 is connected to the candle body 111. The driving mechanism is mounted on the frame 130, and the candle flame light-emitting assembly 21 and the frame 130 are both in connection with the driving mechanism. The control module 35 is connected to the candle flame light-emitting assembly 21 and the driving mechanism. The control module 35 can control turning-on or turning-off of the candle flame light-emitting assembly 21 (e.g., control illumination or extinguishing of the candle flame light-emitting assembly 21). The control module 35 can also control working of the driving mechanism, such that through the driving of the driving mechanism, the candle flame light-emitting assembly 21 is driven to extend to the exterior of the candle body 111, retract to the interior of the candle body from the access hole 11, or through driving of the driving mechanism. The candle body 111 is driven to move in a direction away from the base 112 to expose the charge port 25 and the candle body 111 is driven to move in a direction toward the base 112 to block the charge port 25. Moreover, the candle body 111 can move to fully cover the base 112 and maintain a state of being substantially in the same plane as a bottom surface of the base 112.

The driving mechanism is configured to drive the candle flame light-emitting assembly 21 to extend out of the access hole 11 to the exterior of the candle body 111. The driving mechanism is configured to drive the candle flame light-emitting assembly 21 to retract from the opening/access hole 11 to the interior of the candle body 111. The driving mechanism is also configured to drive the frame 130 to move in a direction away from the base 112, so as to drive the candle body 111 to move in the direction away from the base 112, thereby exposing the charge port 25, and for driving the frame 30 to move in a direction toward the base 112, so as to drive the candle body 111 to move in the direction toward the base 112, thus blocking the charge port 25 through the candle body 111.

The closing mechanism is configured to open the access hole 11 during a process in which the candle flame light-emitting assembly extends out of the access hole 11 to the exterior of the candle body 111. The closing mechanism is also configured to close the access hole 11 during a process in which the candle flame light-emitting assembly retracts from the access hole 11 to the interior of the candle body 111. As such, long-term exposure of the candle flame light-emitting assembly 21 to the exterior which is prone to dust falling can be avoided. Dust can also be prevented from entering the interior of the candle body 111 through the access hole 11, thus facilitating cleaning of the electronic candle.

In some embodiments, the charge port 25 is provided with a charge detection module which is used to detect whether a charge plug is inserted into the charge port 25. The charge plug is a plug of one end of the charge cable for inserting into the charge port 25, and the charge cable is also provided with a plug at the other end thereof for inserting into an external power socket. The charge detection module is connected to the control module 35. When insertion of the charge plug into the charge port 25 is detected, the charge detection module generates a corresponding detection signal and outputs the detection signal to the control module 35. The control module 35 controls the driving mechanism according to the detection signal to drive the frame 130 to keep away from the base 112, so as to drive the candle body 111 to keep away from the base 112, thus exposing the charge port 25.

A specific working process of the electronic candle provided in this embodiment is as follows:

In an initial state, the driving mechanism drives the frame 130 to move in the direction toward the base 112, thereby blocking the charge port 25 through the candle body 11. The appearance of the electronic candle is similar to that of the real candle.

When the electronic candle is required for lighting, the driving mechanism drives the candle flame light-emitting assembly 21 to extend from the access hole 11 to the exterior of the candle body 111. The control module 35 controls the candle flame light-emitting assembly 21 to emit light. During this process, the closing mechanism opens the access hole 11.

When the electronic candle is not in operation, the driving mechanism drives the mimetic candle flame light-emitting assembly 21 to retract from the access hole 11 to the interior of the candle body 111. When charging of the electronic candle is required, the driving mechanism drives the frame 130 to move in the direction away from the base 112, thereby exposing the charge port 25. During this process, the closing mechanism closes the access hole 11.

When the charging is complete, the driving mechanism drives the frame 130 to move in the direction toward the base 112, thereby blocking the charge port 25 using the candle body 111.

In the above embodiments, during the process of charging the electronic candle, the charge detection module continuously detects whether the charge plug is inserted into the charge port 25, so that the candle body 111 can keep its position away from the base 112 through the driving mechanism and the charge port 121 can remain in an exposed state.

Figure 47A:
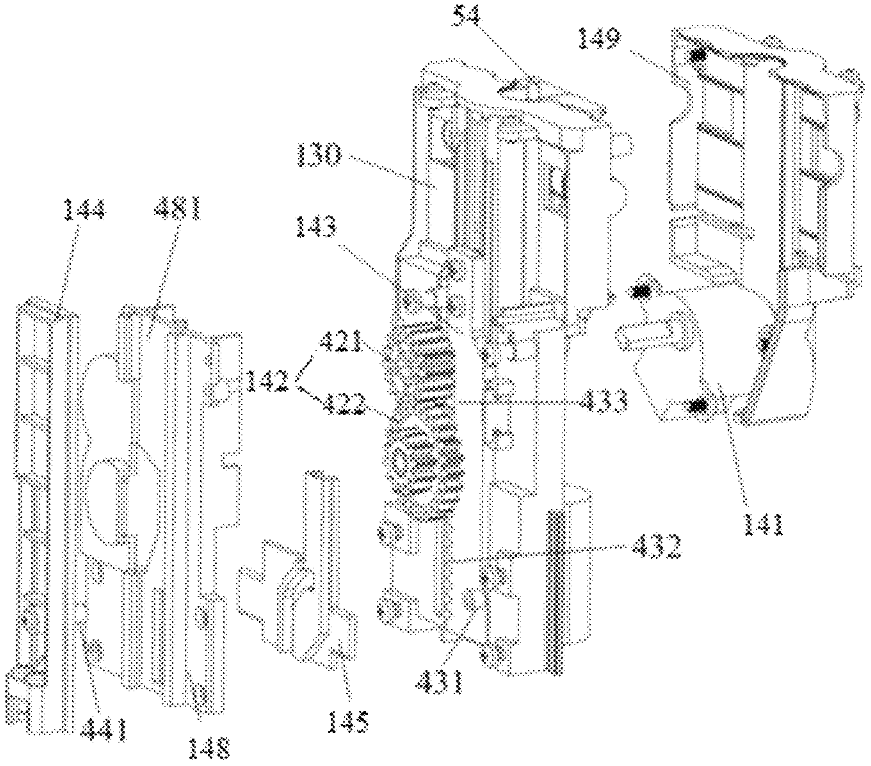
FIG. 47A illustrates an exploded view of an example driving mechanism of an electronic candle in accordance with one or more embodiments of the present technology.
Figure 47B:
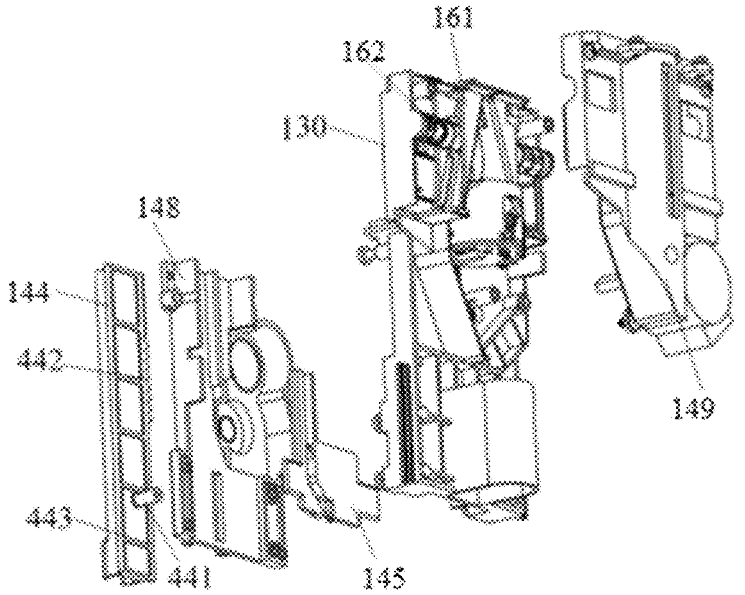
FIG. 47B illustrates another exploded view of an example driving mechanism of an electronic candle in accordance with one or more embodiments of the present technology.
Figure 48B:
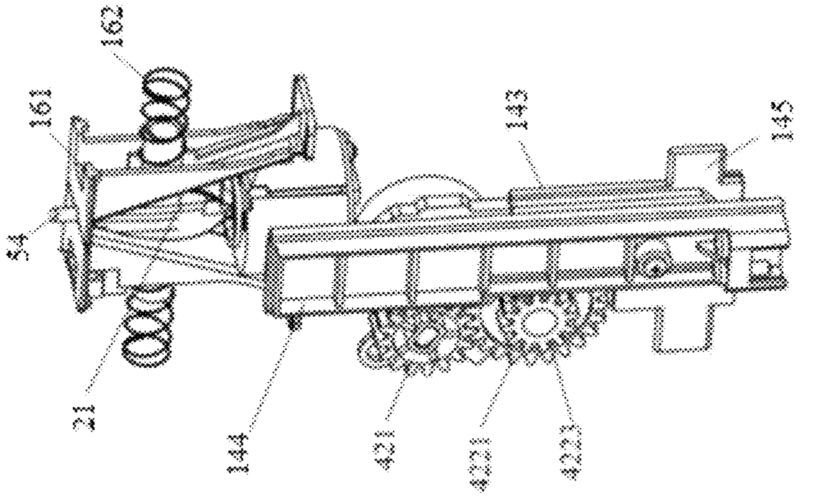
FIG. 48B illustrates another structural view of an example driving mechanism and an example closing mechanism of an electronic candle in accordance with one or more embodiments of the present technology.
Figure 48A:
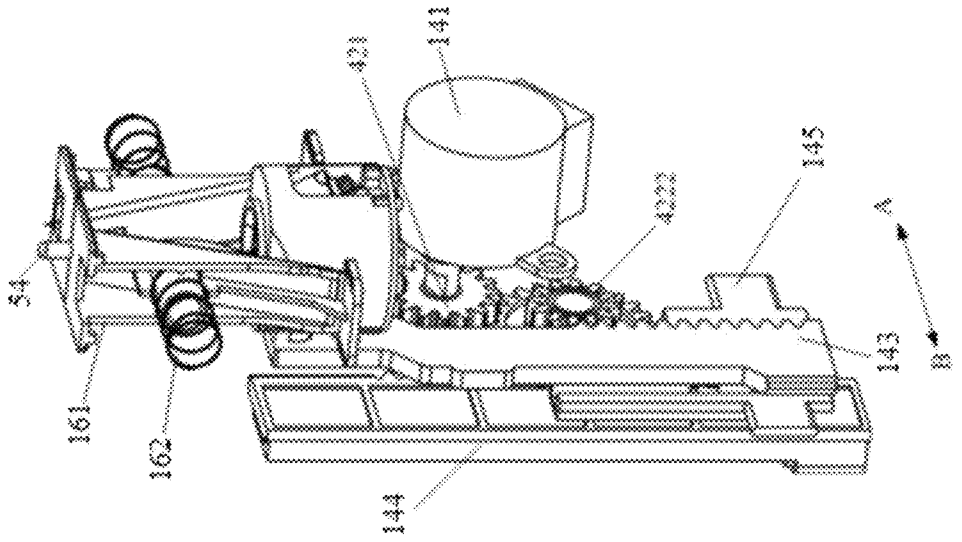
FIG. 48A illustrates a structural view of an example driving mechanism and an example closing mechanism of an electronic candle in accordance with one or more embodiments of the present technology.

FIGS. 47A-B illustrate exploded views of an example driving mechanism of an electronic candle in accordance with one or more embodiments of the present technology. FIGS. 48A-B illustrate structural views of an example driving mechanism and an example closing mechanism of an electronic candle in accordance with one or more embodiments of the present technology. In some embodiments, the driving mechanism includes: a driving motor 141, a gear set 142, a frame rack 143, a base rack 144, and a linkage slide block 145. The driving motor 141 is connected to the control module, the frame rack 143 is connected to the candle flame light-emitting assembly, the base rack 144 is connected to the base 112, the driving motor 141 is fixed to the frame 130, the gear set 142 is rotatably mounted on the frame 130, and the driving motor 141 is in transmission connection with the gear set 142 to drive the gear set 142 to rotate. The frame rack 143 and the base rack 144 are slidably disposed on the frame 130. The frame rack 143 and the base rack 144 are both slidably connected to the linkage slide block 145. In some embodiments, the frame rack 143 and the base rack 144 are disposed parallel to each other, and a slide direction of the linkage slide block 145 is perpendicular to the frame rack 143 and the base rack 144.

Referring to FIG. 48A, the linkage slide block 145 can slide back and forth between a first position A and a second position B. At the first position A, the linkage slide block 145 causes the base rack 144 to engage with the gear set 142 and the frame rack 143 to disengage from the gear set 142. At the second position B, the linkage slide block 145 causes the frame rack 143 to engage with the gear set 142 and the base rack 144 to disengage from the gear set 142.

When the linkage slide block 145 slides to the first position A, causing the base rack 144 to engage with the gear set 142 and the frame rack 143 to disengage from the gear set 142, the driving motor 141 drives the gear set 142 to rotate, so as to drive, through the gear set 142, the base rack 44 to move back and forth along a length direction thereof, thereby driving the candle body 111 to move in the direction away from the base 112 to expose the charge port 25 or driving the candle body 111 to move in the direction toward the base 112 to block the charge port 25 through the candle body 111. When the linkage slide block 145 slides to the second position B, causing the frame rack 143 to engage with the gear set 142 and the base rack 144 to disengage from the gear set 142, the driving motor 141 drives the gear set 142 to rotate, so as to drive, through the gear set 142, the frame rack 143 to move back and forth along a length direction thereof, thereby driving the candle flame light-emitting assembly to extend to the exterior of the candle body 111 or retract to the interior of the candle body 111 from the access hole 11.

Referring to FIG. 47A, the frame rack 143 has a first toothed segment 432 and a first smooth segment 433. The first toothed segment 432 is a segment provided with teeth of the rack that can engage with the gear set 142. The first smooth segment 433 is a segment provided with no teeth that can disengage from the gear set 142. In the initial state, the driving motor 141 drives the gear set 142 to rotate, so as to drive, through the gear set 142, the frame rack 143 to move back and forth along the length direction thereof, thereby driving the mimetic candle flame light-emitting assembly to extend to the exterior of the candle body 111 or retract to the interior of the candle body 111 from the access hole 11, in which process the frame guide column 431 slides along the first vertical guide groove. The driving motor 141 continues to drive the gear set 142 to rotate. The frame guide column 431 slides from the first vertical guide groove 451 to the first inclined guide groove, and the linkage slide block 145 moves to the first position A, causing the base rack 144 to engage with the gear set 142 and the frame rack 143 to disengage from the gear set 142. In some embodiments, from the initial state until the frame guide column 431 slides from the first vertical guide groove 451 to the first inclined guide groove 452, the first toothed segment 432 engages with the gear set 142. When the frame guide column 431 slides to the first inclined guide groove 452, causing the linkage slide block 145 to move to the first position A, the first smooth segment 433 moves to the gear set 142 such that the frame rack disengages from the gear set.

Referring to FIG. 47B, the base rack 144 has a second toothed segment 442 and a second smooth segment 443. The second toothed segment 442 is a segment provided with teeth of the rack that can engage with the gear set 142. The second smooth segment 443 is a segment provided with no teeth that can disengage from the gear set 142. In the initial state, the driving motor 141 drives the gear set 142 to rotate, so as to drive, through the gear set 142, the base rack 144 to move back and forth along the length direction thereof, thereby driving the candle body 111 to move in the direction away from the base 112 to expose the charge port 25, in which process the base guide column 441 slides along the second vertical guide groove. The driving motor 141 continues to drive the gear set to rotate. The base guide column 441 slides from the second vertical guide groove to the second inclined guide groove 454. The linkage slide block 145 moves to the first position B, causing the frame rack 143 to engage with the gear set 142 and the base rack 144 to disengage from the gear set 142. In some embodiments, from the initial state until the base guide column 441 slides from the second vertical guide groove to the second inclined guide groove, the second toothed segment 442 engages with the gear set 142. When the base guide column 441 slides to the second inclined guide groove, causing the linkage slide block to move to the second position B, the second smooth segment 443 moves to the gear set 142, thereby causing the base rack to disengage from the gear set.

Referring to FIG. 48A and FIG. 48B, the closing mechanism includes a closing member 161 and a closing reset member 162. The closing member 161 is slidably disposed in the mounting cavity to open or close the access hole 11. The closing reset member 162 is disposed between the closing member 161 and a cavity wall of the mounting cavity. When the closing member 161 opens the access hole 11, the closing reset member 162 stores elastic potential energy. When the closing member 61 closes the access hole 11, the closing reset member 62 releases the elastic potential energy.

In some embodiments, the closing mechanism includes two closing members 161 and two closing reset members 162, with each closing member 161 corresponding to a closing reset member 162. The closing reset member 162 is preferably a spring, with one end of the spring abutting against the closing member 161 and the other end abutting against the cavity wall of the mounting cavity. In some embodiments, the closing reset member 162 is provided with a mounting column, with one end of the spring sleeving the mounting column. The two closing members 161 are disposed below the access hole 11. The two closing members 161 can move toward each other to open the access hole and can move away from each other to close the access hole.

In some embodiments, during the process in which the driving mechanism drives the candle flame light-emitting assembly 21 to extend out of the access hole 11 to the exterior of the candle body 111, a push action of the candle flame light-emitting assembly causes the two closing members to move toward each other, thereby opening the access hole 11. During this process, the closing reset members 162 are compressed and store the elastic potential energy. During the process in which the driving mechanism drives the mimetic candle flame light-emitting assembly 21 to retract from the access hole 11 to the interior of the candle body 11, the closing reset members 162 can release the elastic potential energy, causing the two closing members 161 to move away from each other, and thereby closing the access hole 11.

In some embodiments, the electronic candle provided in this embodiment further includes a wick assembly. The wick includes a wick 54 and a wick reset member 55. The wick 54 is hinged to the closing mechanism. More specifically, the wick 54 is hinged to the closing member 161 of the closing mechanism, and the wick reset member 55 is disposed between the wick 54 and the closing member 161 of the closing mechanism. When the closing member 161 opens the access hole 11, the wick 54 can be hidden by rotating around a hinge position between the wick 54 and the closing member 161. During this process, the wick reset member 55 is subjected to a force and stores elastic potential energy, such that the wick 54 moves from the access hole 11 to the interior of the candle body 111. When the closing member 161 closes the access hole 11, the wick reset member 55 releases the elastic potential energy, causing the wick 54 to rotate in an opposite direction around the hinge position, such that the wick 54 moves from the access hole 11 to the exterior of the candle body 111.

In some embodiments, after power of the rechargeable battery 41 runs out, the candle body 111 cannot move away from the base 112 through an action of the driving mechanism to expose the charge port 25. Therefore, detection of a battery level of the rechargeable battery can be performed, so that when the battery level reaches a preset battery level, the charge port 25 can be exposed through the action of the driving mechanism (e.g., as shown in FIG. 41).

Figure 49B:
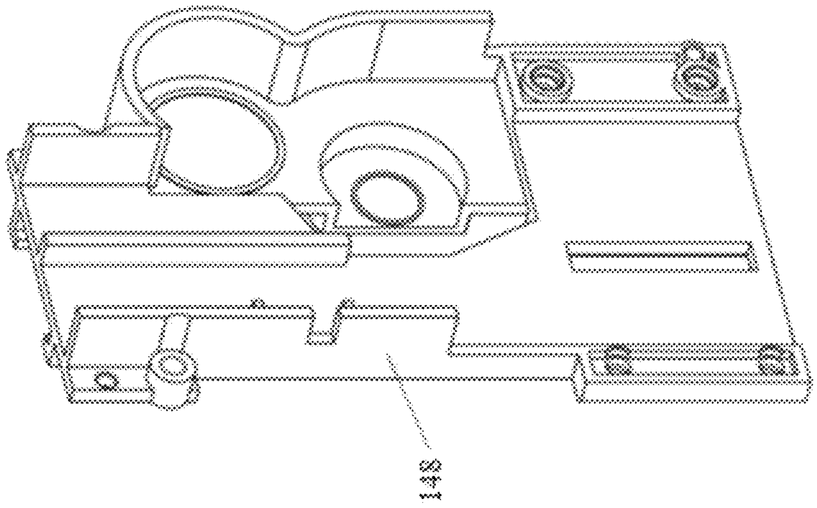
FIG. 49B illustrates another structural view of an example gear cover of an electronic candle in accordance with one or more embodiments of the present technology.
Figure 49A:
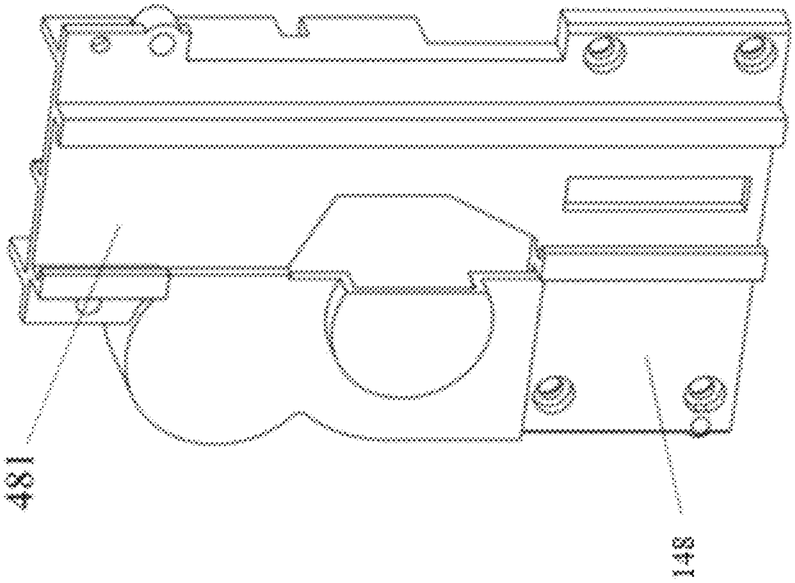
FIG. 49A illustrates a structural view of an example gear cover of an electronic candle in accordance with one or more embodiments of the present technology.

In some embodiments, as shown in FIG. 46, the driving mechanism includes a gear cover 148 and a frame cover 149 disposed on two opposite sides of the frame 130. FIGS. 49A-B illustrate structural views of an example gear cover of an electronic candle in accordance with one or more embodiments of the present technology. The gear cover 148 covers a side of the frame 130 provided with the gear set 142 to protect the gear set 142, preventing the operating gear set 142 from being damaged by other things. The candle flame light-emitting assembly 21 is disposed between the gear cover 148 and the frame cover 149. The gear cover 148 is provided with a rack guide portion 481, and the base rack 144 is slidably disposed on the rack guide portion 481. As such, a slide fit relationship is formed between the base rack 144 and the frame 130 indirectly.

Referring to FIGS. 47A-48B, the gear set 142 includes a driving gear 421 and driven gears 422. The driven gears 422 include a primary driven gear 4221, a frame secondary driven gear 4222, and a base secondary driven gear 4223. The frame secondary driven gear 4222 and the base secondary driven gear 4223 are respectively fixed on two opposite sides of the primary driven gear 4221 and coaxial with the primary driven gear 4221. The driving gear 421 engages with the primary driven gear 4221. When the linkage slide block 45 slides to the second position B, the frame secondary driven gear 4222 is used for engaging with the frame rack 143; and when the linkage slide block 45 slides to the first position A, the base secondary driven gear 4223 is used for engaging with the base rack 144.

Figure 50B:
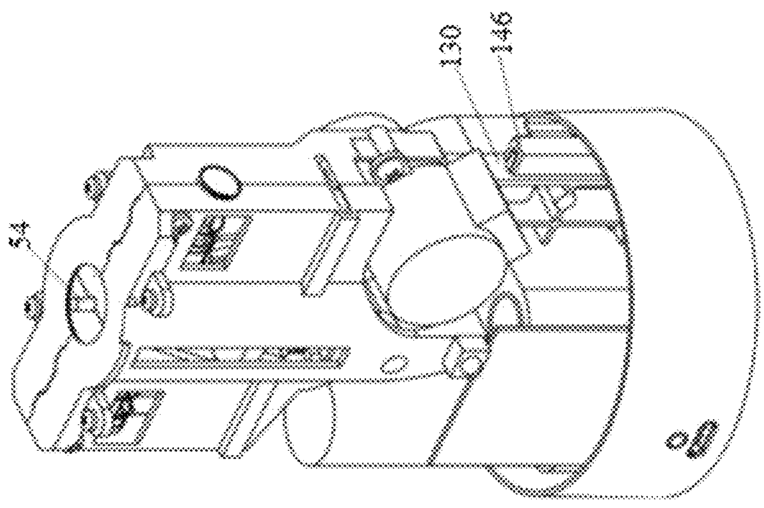
FIG. 50B illustrates an example electronic candle with a candle main body removed in accordance with one or more embodiments of the present technology.
Figure 50A:
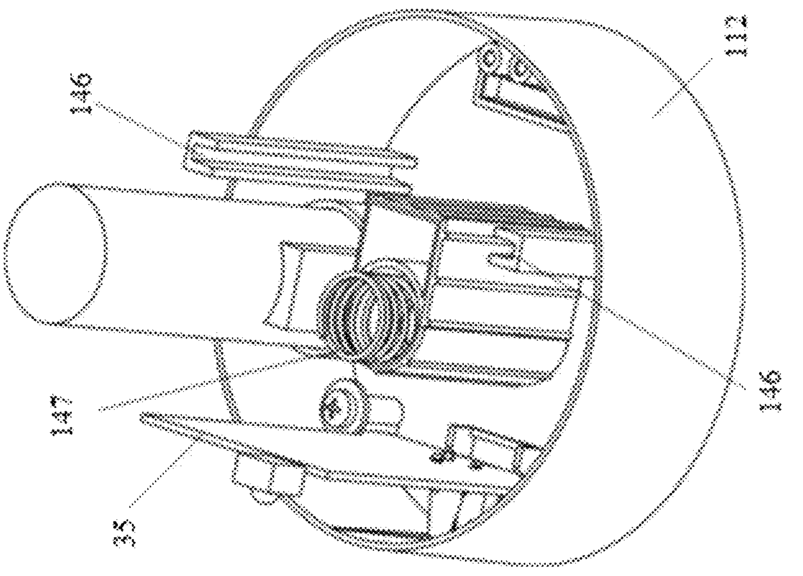
FIG. 50A illustrates a structural view of an example base of an electronic candle in accordance with one or more embodiments of the present technology.

FIG. 50A illustrates a structural view of an example base of an electronic candle in accordance with one or more embodiments of the present technology. The driving mechanism includes a frame buffer member 147 disposed between the frame 130 and the base 112. The frame buffer member 147 is configured to buffer the frame 130 when the frame 30 moves in the direction toward the base 112. FIG. 50B illustrates an example electronic candle with a candle main body removed in accordance with one or more embodiments of the present technology. The driving mechanism further includes a frame guide groove 146 mounted on the base 112, and the frame 130 is slidably disposed in the frame guide groove 146. In some embodiments, two frame guide grooves 146 are provided. The frame 130 is slidably disposed in the two frame guide grooves 146 at two opposite sides thereof. When the linkage slide block 145 slides to the second position B, causing the base rack 144 to engage with the gear set 142, the driving motor 141 drives the gear set 142 to rotate, so as to drive, through the gear set 142, the base rack 144 to move back and forth along the length direction thereof, thereby driving the candle body 111 through the frame 130 to move in the direction away from the base 112 to expose the charge port 35 or driving the candle body 111 through the frame 130 to move in the direction toward the base 112 to block the charge port 25. The provision of the two frame guide grooves 146 can ensure the movement stability of the frame 130.

Figure 51B:
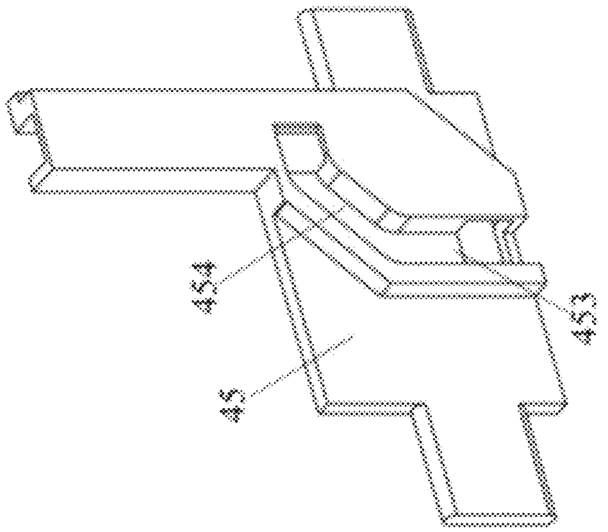
FIG. 51B illustrates another structural view of a linkage slide block in a driving mechanism of an electronic candle in accordance with one or more embodiments of the present technology.
Figure 51A:
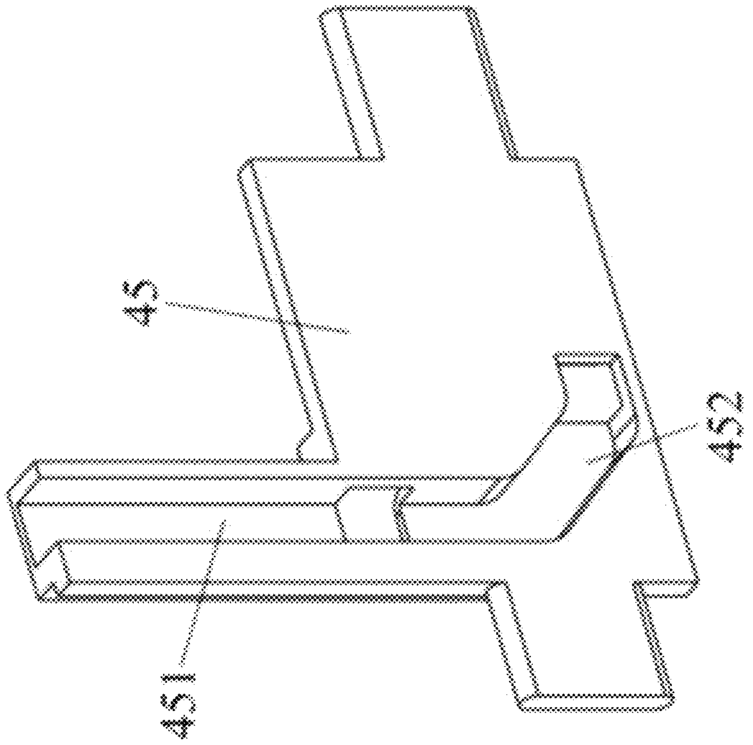
FIG. 51A illustrates a structural view of a linkage slide block in a driving mechanism of an electronic candle in accordance with one or more embodiments of the present technology.

FIGS. 51A-B illustrate structural views of a linkage slide block in a driving mechanism of an electronic candle in accordance with one or more embodiments of the present technology. The linkage slide block 145 is disposed between the frame rack 143 and the base rack 144. In some embodiments, the linkage slide block 145 includes a first vertical guide groove 451 and a first inclined guide groove 452 on one side thereof that faces the frame rack 143. Referring back to FIG. 47A, the frame rack 143 is provided with a frame guide column 431 which can slide along the first vertical guide groove 451 to the first inclined guide groove 452 such that the linkage slide block 145 slides to the first position A, causing the base rack 144 to engage with the gear set 142 and the frame rack 143 to disengage from the gear set 142. As shown in FIG. 51B, the linkage slide block 145 includes a second vertical guide groove 453 and a second inclined guide groove 454 on one side thereof that faces the base rack 144. The base rack 144 includes a base guide column 441 which can slide along the second vertical guide groove 453 to the second inclined guide groove 454 such that the linkage slide block 145 slides to the second position B, causing the frame rack 143 to engage with the gear set 142 and the base rack 144 to disengage from the gear set 142.

In some embodiments, the electronic candle provided by the present application further includes a remote control receiving unit connected to the control module configured to a remote control signal. The remote control signal is transmitted by an external remote control transmission unit. The remote control receiving unit outputs the received remote control signal to the control module, and the remote control signal can enable the control module to output one of the turning-on command, the turning-off command, the working mode command, and the timing command.

Figure 52:
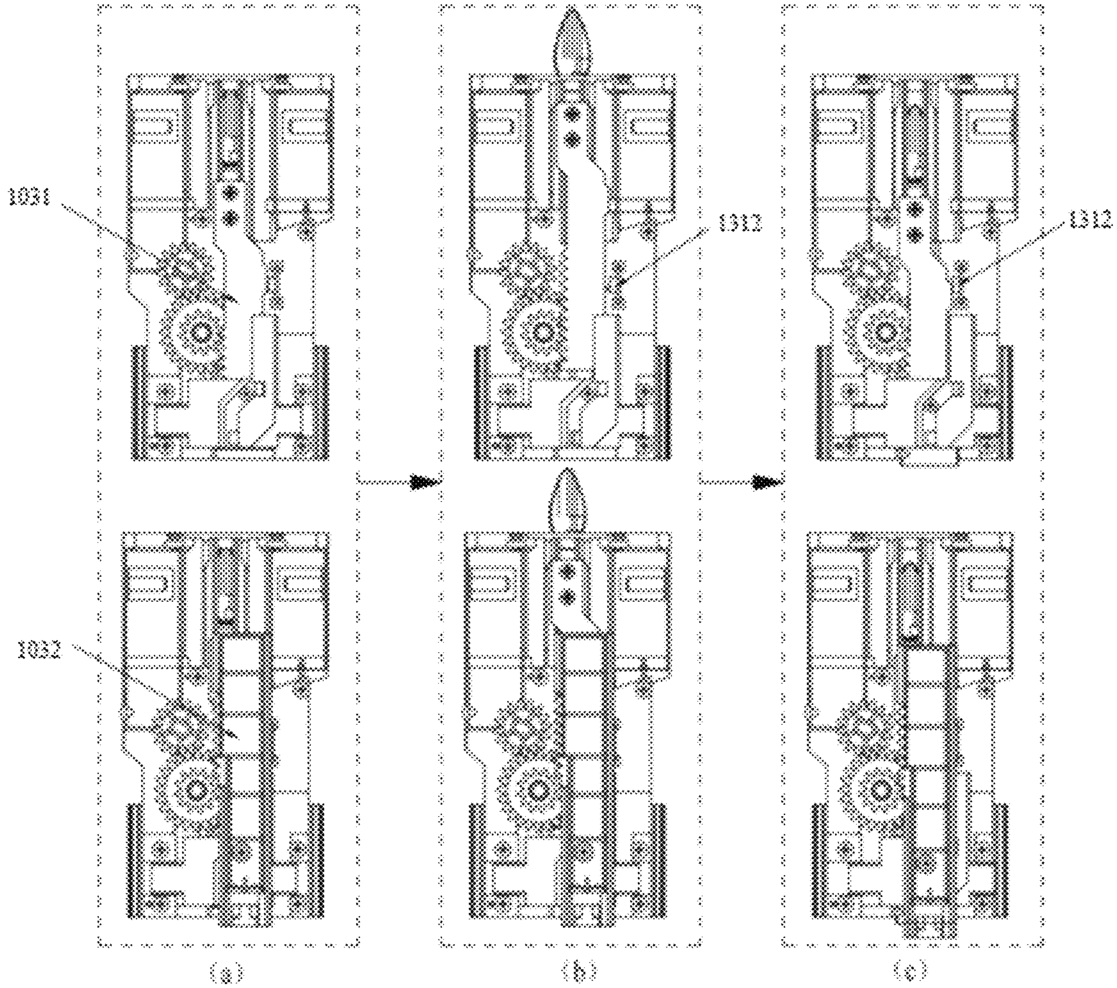
FIG. 52 a schematic diagram showing a working principle of the electronic candle in accordance with one or more embodiments of the present technology.

FIG. 52 is a schematic diagram showing a working principle of the electronic candle in accordance with one or more embodiments of the present technology. FIG. 52(*a*) illustrates the positional relationship between the lamp bracket rack 1031 and the base rack 1032 when the light-emitting mechanism is located inside the housing. FIG. 52(*b*) shows the positional relationship between the lamp bracket rack 1031 and the base rack 1032 when the light-emitting mechanism extends out from the housing. FIG. 52(*c*) shows the positional relationship between the lamp bracket rack 1031 and the base rack 1032 when the light-emitting mechanism is located on the lowermost side relative to the housing. It should be noted that the lamp bracket rack 1031 in FIG. 52 is located on the rear side of the main gear. To facilitate viewing the positional relationship, the lamp bracket rack 1031 is depicted as being on the front side of the main gear.

In an initial state as shown in FIG. 52(*a*), the pinions are engaged with the lamp bracket rack 1031 and are not engaged with the base rack 1032. In If the light-emitting mechanism needs to extend out from the housing, the driving element is controlled by the control module to operate, the double circular gear is driven to rotate counterclockwise to cause the lamp bracket rack 1031 and the light-emitting mechanism to perform a relative movement upwards, the opening and closing mechanism opens the access hole on the housing, and the flame piece on the light-emitting mechanism extends out from the housing and is in the state shown in FIG. 52(*b*). When the flame piece in FIG. 52(*b*) needs to descend, the control module indirectly controls, by means of the driving element, the double circular gear to rotate clockwise until the lamp bracket rack 1031 returns to the state shown in FIG. 52(*a*). At that time, if the housing needs to rise to expose the charging port, the double circular gear needs to continue being rotated clockwise, and the lamp bracket guide post on the lamp bracket rack 1031 moves down along the straight guide groove of the first guide groove and enters the bent portion. If the lamp bracket guide post continues moving down after entering the bent portion, the linked slide block will be driven to slide to the right, and the linked slide block drives the pinions to move upwards relative to the base guide post on the base rack 1032. After the linked slide block slides to the right, the lamp bracket rack 1031 is disengaged downwards from the pinions, and the pinions are engaged upwards with the base rack relative to the base. As shown in FIG. 52(*c*), after the pinions are engaged with the base rack 1032, the pinions continue being rotated clockwise, the pinions move upwards relative to the base, and the lamp bracket, the housing and the like are synchronously driven to rise together, so as to expose the charging port. After the charging operation is completed, the driving element is controlled by the control module to indirectly drive the double circular gear to rotate counterclockwise. The double circular gear moves down relative to the base rack 1032 until the charging port is covered. After the charging port is covered, the double circular gear can continue rotating counterclockwise. The double circular gear moves down relative to the base rack 1032. The pinions are disengaged from the base rack 1032.

The linked slide block 035 moves to the left. The lamp bracket guide post is driven to move up. The lamp bracket guide post enters the straight guide groove from the bent portion on the first guide groove, and the lamp bracket rack 1031 is engaged with the pinions. At that time, as shown in FIG. 52(*c*), the flame piece on the light-emitting mechanism is closer to the lower side. If it is desired that the flame piece return to an initial position, the double circular gear can continue rotating counterclockwise for a period of time, and then the lamp bracket rack 1031 drives the light-emitting mechanism to move up a certain distance to return to the state shown in FIG. 52(*a*).

According to a first aspect, an electronic candle with a height adjustment function comprises a housing, wherein the housing is formed by snap-fit connection of a cylindrical upper housing and a cylindrical lower housing; a cavity is provided within the housing; the upper housing comprises an upper housing surface and an upper housing side surface, and the lower housing comprises a lower housing surface and a lower housing side surface; a flame sheet opening is provided on the upper housing surface; a flame simulation device, a lifting device, a lifting drive device, and a power supply module are provided within the cavity; the power supply module is connected to the lifting drive device; the power supply module is used for providing the lifting drive device with a power supply; the lifting drive device is connected to the lifting device, and the lifting drive device is used for providing the lifting device with a driving force; the lifting device is connected to the flame simulation device, and is used for, when obtaining the driving force provided by the lifting drive device, lifting the flame simulation device from the flame sheet opening provided on the upper housing surface; the flame simulation device is used for simulating a candle flame after being lifted from the flame sheet opening provided on the upper housing surface; an extendable and retractable device and a drive device are further provided within the cavity; the power supply module is further connected to the drive device, and the power supply module is further used for providing the drive device with a power supply; the drive device is connected to the extendable and retractable device, and the drive device is used for providing the extendable and retractable device with a driving force; and the extendable and retractable device is separately connected to the upper housing and the lower housing, and the extendable and retractable device is used for, when obtaining the driving force provided by the drive device, snap-fitting or separating the upper housing and the lower housing, so as to reduce or increase the height of the electronic candle. In some embodiments, when the height of the electronic candle reaches the lowest point, the upper housing is fully snap-fit within the lower housing. In some embodiments, when the height of the electronic candle reaches the lowest point, the lower housing is fully snap-fit within the upper housing. In some embodiments, when the height of the electronic candle reaches the lowest point, the upper housing is partially snap-fit within the lower housing. In some embodiments, when the height of the electronic candle reaches the lowest point, the lower housing is partially snap-fit within the upper housing. In some embodiments, the power supply module comprises an energy storage module and a charging module; and the charging module is used for charging the energy storage module. In some embodiments, the energy storage module is a rechargeable battery. In some embodiments, the power supply module comprises an external power supply interface, and the external power supply interface is used for externally connecting a charging power supply to charge the energy storage module. In some embodiment, the external power supply interface is provided on the lower housing surface. In some embodiments, the lifting drive device and the drive device share a stepping motor.

According to a second aspect, an embodiment provides an electronic candle, comprising a housing, wherein the housing is formed by connecting a cylindrical upper housing body and a cylindrical lower housing body, and the housing is provided with a cavity. The upper housing body comprises an upper housing front surface and an upper housing side surface, and the lower housing body comprises a lower housing bottom surface and a lower housing side surface. The upper housing front surface is provided with an opening. A flame simulating apparatus, a lifting apparatus, a lifting drive apparatus, and a power supply module are provided in the cavity. The power supply module is connected to the lifting drive apparatus, and the power supply module is configured to supply power to the lifting drive apparatus. The lifting drive apparatus is connected to the lifting apparatus, and the lifting drive apparatus is configured to provide a driving force to the lifting apparatus. The lifting apparatus is connected to the flame simulating apparatus, and is configured to lift the flame simulating apparatus from the opening provided in the upper housing front surface when the driving force provided by the lifting drive apparatus is acquired. The flame simulating apparatus is configured to simulate a candle flame after being lifted from the opening provided in the upper housing front surface. The power supply module comprises an external power supply interface, a charging circuit, and a rechargeable battery. The external power supply interface is provided on the upper housing side surface or the lower housing side surface and is configured for input of an external power supply. The charging circuit is connected to the external power supply interface and the rechargeable battery, respectively, and the charging circuit is configured to charge the rechargeable battery when the external power supply is inputted into the external power supply interface. The rechargeable battery is configured to supply power to the electronic candle. An extendable and retractable apparatus and a drive apparatus are further provided in the cavity. The drive apparatus is connected to the extendable and retractable apparatus, and the drive apparatus is configured to provide a driving force to the extendable and retractable apparatus. The extendable and retractable apparatus is connected to the upper housing body and the lower housing body, respectively, and is configured to fasten the upper housing body and the lower housing body or separate the upper housing body and the lower housing body when the driving force provided by the drive apparatus is acquired. When the upper housing body and the lower housing body are fastened and the external power supply interface is provided on the upper housing side surface, the lower housing side surface completely blocks the external power supply interface. When the upper housing body and the lower housing body are fastened and the external power supply interface is provided on the lower housing side surface, the upper housing side surface completely blocks the external power supply interface. When the upper housing body and the lower housing body are separated, the external power supply interface provided on the upper housing side surface or the lower housing side surface is completely exposed to the outside for the input of the external power supply. In an embodiment, a control circuit board is further provided in the cavity. The control circuit board is provided with a control processor, a power supply monitoring circuit, and a drive control circuit. The power supply monitoring circuit is electrically connected to the control processor and the rechargeable battery, respectively, and the power supply monitoring circuit is configured to monitor a power parameter of the rechargeable battery and send the power parameter acquired by monitoring to the control processor. The control processor is connected to the drive control circuit, and the control processor is configured to send a charging required control signal to the drive control circuit when the power parameter of the rechargeable battery is not greater than a preset threshold value. The drive control circuit is connected to the drive apparatus, and the drive control circuit is configured to, in response to the charging required control signal, send a separating drive control signal to the drive apparatus; and the drive apparatus, in response to the separating drive control signal, separates the upper housing body and the lower housing body by means of the extendable and retractable apparatus, so as to completely expose the external power supply interface to the outside. In an embodiment, the control processor is further configured to send a charging end control signal to the drive control circuit when the power parameter of the rechargeable battery is greater than a preset threshold value and no external power supply is connected to the external power supply interface. The drive control circuit is further configured to, in response to the charging end control signal, send a fastening drive control signal to the drive apparatus. The drive apparatus is further configured to, in response to the fastening drive control signal, fasten the upper housing body and the lower housing body by means of the extendable and retractable apparatus, so as to completely block the external power supply interface. In an embodiment, the external power supply interface is provided with an indicator light. The control circuit board is provided with an indicator light drive circuit, the indicator light drive circuit is connected to the control processor and the indicator light, respectively, the control processor is further configured to send an indicator light color control signal to the indicator light drive circuit based on the power parameter of the rechargeable battery, and the indicator light drive circuit is configured to, in response to the indicator light color control signal, control the light color of the indicator light. In an embodiment, the upper housing body or the lower housing body is provided with a touch switch. The touch switch is connected to the control processor. When the upper housing body and the lower housing body are fastened, the touch switch is configured to, in response to a touch action, send an active charging signal to the control processor. The control processor is configured to, in response to the active charging signal, send the charging required control signal to the drive control circuit, so as to completely expose the external power supply interface to the outside. In an embodiment, when the upper housing body and the lower housing body are separated, the touch switch is further configured to, in response to a touch action, send a forced end signal to the control processor. The control processor is configured to, in response to the forced end signal, send the fastening drive control signal to the drive control circuit, so as to completely block the external power supply interface. In an embodiment, the external power supply interface is a type-C interface; and the rechargeable battery is a lithium battery. In an embodiment, when the upper housing body and the lower housing body are fastened, the upper housing side surface of the upper housing body is completely fastened inside of the lower housing side surface of the lower housing body. Alternatively, when the upper housing body and the lower housing body are completely fastened, the lower housing side surface of the lower housing body is completely fastened inside of the upper housing side surface of the upper housing body. In an embodiment, when the upper housing body and the lower housing body are fastened, the upper housing side surface of the upper housing body is partially fastened inside of the lower housing side surface of the lower housing body. Alternatively, when the upper housing body and the lower housing body are fastened, the lower housing side surface of the lower housing body is partially fastened inside of the upper housing side surface of the upper housing body. According to a second aspect of the present application, an embodiment provides a charging control method for an electronic candle, comprising: monitoring a power parameter of a rechargeable battery; restoring a flame simulating apparatus back into a cavity of the electronic candle when the power parameter of the rechargeable battery is not greater than a preset threshold value, and separating an upper housing body and a lower housing body of a housing of the electronic candle, so as to expose an external power supply interface to the outside; and connecting an external power supply to the external power supply interface, so as to charge the rechargeable battery. In the electronic candle according to the foregoing embodiment, the housing of the electronic candle is formed by connecting the upper housing body and the lower housing body, and the housing is provided with the cavity. An extendable and retractable apparatus and a drive apparatus are provided in the cavity. The drive apparatus is configured to provide a driving force to the extendable and retractable apparatus, and the extendable and retractable apparatus is configured to fasten the upper housing body and the lower housing body or separate the upper housing body and the lower housing body. When the fastening is completed, the external power supply interface is completely blocked. When the separating is completed, the external power supply interface is completely exposed. Because the power supply interface for charging is exposed to the outside only when the electronic candle needs to be charged, the overall appearance of the electronic candle is unaffected, greatly improving the user experience.

According to a third, an electronic candle comprises a cylindrical housing. The housing comprises an upper bottom surface, a lower bottom surface, and a side surface; the upper bottom surface is provided with an opening, the lower bottom surface is provided with a power switch, and the side surface is provided with a curved screen; the housing is internally provided with a flame simulating apparatus, a lifting apparatus, a drive apparatus, and a power supply module; the power supply module is separately connected to the drive apparatus and the power switch; when the power switch is turned on, the power supply module provides power to the drive apparatus; the drive apparatus is connected to the lifting apparatus, and the drive apparatus is used for providing a driving force to the lifting apparatus; the lifting apparatus is connected to the flame simulating apparatus, and is used for, when obtaining the driving force provided by the drive apparatus, lifting the flame simulating apparatus from the opening provided on the upper bottom surface; the flame simulating apparatus is used for simulating a candle flame after being lifted from the opening provided on the upper bottom surface; and the curved screen comprises a first display region, a second display region, and a third display region, the first display region, the second display region, and the third display region are each used for displaying a scene mode interface, and the scene mode interfaces include an anniversary scene interface, a birthday celebration scene interface and a festival celebration scene interface. In some embodiments, the curved screen covers all of the side surface. In some embodiments, the housing is further internally provided with a first display drive unit, a second display drive unit and a third display drive unit, the first display drive unit is used for driving the first display region to display the anniversary scene interface in response to a scene switching electrical signal, the second display drive unit is used for driving the second display region to display the birthday celebration scene interface in response to the scene switching electrical signal, and the third display drive unit is used for driving the third display region to display the festival celebration scene interface in response to the scene switching electrical signal. In some embodiments, a touch key is provided on the upper bottom surface of the housing, the touch key is connected to the first display drive unit, the second display drive unit and the third display drive unit, and the touch key is used for sending the scene switching electrical signal to the first display drive unit, the second display drive unit, or the third display drive unit. In some embodiments, a touch screen is provided on the curved screen, the touch screen is connected to the first display drive unit, the second display drive unit and the third display drive unit, and the touch screen is used for sending the scene switching electrical signal to the first display drive unit, the second display drive unit, or the third display drive unit. In some embodiments, the touch screen covers the entire curved screen. In some embodiments, a magnetic block is provided on the bottom surface of the housing, and the magnetic block is used for attaching to metal, so as to stabilize the electronic candle when the electronic candle is placed on a flat metal surface. In some embodiments, the power supply module comprises a charging module and an energy storage module, the energy storage module is used for providing power to the electronic candle, and the charging module is used for charging the energy storage module when externally connected to a charging power supply. In some embodiments, the energy storage module is a rechargeable battery. In some embodiments, the curved screen is further electrically connected to the energy storage module, and is used for displaying an electricity quantity of the energy storage module. According to the electronic candle of the above embodiments, since the curved screen provided on the side surface can switch to display different scene mode interfaces, the electronic candle can meet the needs of different usage scenes, thereby improving user experience.

According to a fourth aspect, an electronic candle comprising a candle body and a protective cap; the candle body comprises a housing, the housing is a closed cylinder surrounded by a top surface, a side surface, and a bottom surface, and a cavity is provided within the housing; a flame sheet opening is provided on the top surface; and the protective cap is movably connected to an outer edge of the top surface; a flame simulation device, a lifting device, a lifting drive device, a power supply module, and a switch device are provided within the cavity; the power supply module is connected to the lifting drive device, and the power supply module is used for supplying power to the lifting drive device; the lifting drive device is connected to the lifting device, and the lifting drive device is used for providing the lifting device with a driving force; the lifting device is connected to the flame simulation device, and is used for, when obtaining the driving force provided by the lifting drive device, raising the flame simulation device from the flame sheet opening provided on the top surface; the flame simulation device is used for simulating a candle flame after being raised from the flame sheet opening provided on the top surface; the switch device is provided on the outer edge of the top surface and is electrically connected to the power supply module; and when the protective cap is fastened to the outer edge of the top surface, the switch device turns off the power supply module so as to stop supplying power to the lifting drive device. In some embodiments, the switch device is a fastening switch. In some embodiments, the protective cap is a transparent circular arch shaped structure. In some embodiments, the power supply module comprises an energy storage module and a charging module; and the charging module is used for charging the energy storage module. In some embodiments, the energy storage module is a rechargeable battery. In some embodiments, the charging module is a wireless charging device, and the wireless charging device is used for obtaining electrical energy by means of wireless charging so as to charge the energy storage module. In some embodiments, the electronic candle further comprises an electronic candlestick, wherein the electronic candlestick comprises a load-bearing base, a candlestick body and a tray; the candlestick body is used for connecting the load-bearing base and the tray; the tray is used for being movably connected to the bottom surface of the housing so as to fix the candle body; the load-bearing base is used for keeping the candle body stable when placed on a plane; an external power supply interface is provided on the load-bearing base, and the external power supply interface is used for external power supply input; and a wireless charging circuit is provided within the electronic candlestick, a wireless charging coil is provided on the tray, the wireless charging circuit is separately electrically connected to the external power supply interface and the wireless charging coil, and the wireless charging circuit is used for wirelessly charging the wireless charging device by using electrical energy inputted to the external power supply interface by means of the wireless charging coil. In some embodiments, the external power supply interface is a Type-C interface. In some embodiments, a power supply switch is provided on the candlestick body, the power supply switch is connected between the wireless charging circuit and the external power supply interface, and the power supply switch is used for connecting or disconnecting the wireless charging circuit and the external power supply interface. In some embodiments, metal blocks are provided on the tray, magnetic blocks are provided on the bottom surface of the housing, and the candle body is movably connected by means of the magnetic blocks provided on the bottom surface of the housing attracting the metal blocks on the tray. According to the electronic candle of the above embodiments, since the switch function of the electronic candle is achieved by means of the protective cap being fastened to the electronic candle body, the flame simulation device can be protected by means of the protective cap when the electronic candle is not in use, thereby improving user experience.

According to a fifth aspect, an electronic candle includes an electronic candlestick. The electronic candlestick includes a load bearing base, a body and a tray; the body is used to connect the load bearing base and the tray. The tray is used to be movably connected to the bottom of the electronic candle to hold the electronic candle; the load bearing base is used to maintain the stability of the electronic candlestick when being placed on a flat surface; the load bearing base is provided with an external power interface, which is used for external power input; a wireless charging circuit is provided within the electronic candlestick, and the tray is provided with a wireless charging coil, wherein the wireless charging circuit is respectively electrically connected to the external power interface and the wireless charging coil, and is used to wirelessly charge, by means of the wireless charging coil, the electronic candle movably connected to the tray with electrical energy input to the external power interface; an energy storage module and a charging module are provided within the electronic candle, wherein the energy storage module is used to provide electrical energy to the electronic candle, and the charging module is used to obtain electrical energy by a wireless charging coil provided on the tray to charge the energy storage module; and a first magnetic attachment device is provided on the tray, a second magnetic attachment device is provided at the bottom of the electronic candle, and the tray and the electronic candle are in attachment connection by means of the first magnetic attachment device and the second magnetic attachment device. In an embodiment, the external power interface is a Type-C interface. In an embodiment, the body is provided with a power switch, which is connected between the wireless charging circuit and the external power interface, and is used to connect or disconnect the wireless charging circuit with the external power interface. In an embodiment, the power switch is a touch key switch. In an embodiment, the first magnetic attachment device is a magnetic block and the second magnetic attachment device is a metal block; or, the second magnetic attachment device is a magnetic block and the first magnetic attachment device is a metal block. In an embodiment, the tray is provided with a position mark for indicating a contact region of the tray with the bottom of the electronic candle. In some embodiments, an energy storage module and a charging module are provided within the electronic candle, the energy storage module is used to provide electrical energy to the electronic candle, and the charging module is used to obtain electrical energy from the wireless charging coil of the electronic candlestick as described in the firs aspect to charge the energy storage module. In an embodiment, the energy storage module is a rechargeable battery. In an embodiment, the electronic candle further includes a display module which is electrically connected to the energy storage module for displaying the electricity quantity of the energy storage module. In an embodiment, an electronic candle further includes a flame simulation unit and a main control unit for controlling the flame simulation unit; and the main control unit further comprises a time calculating unit and a timing unit, the time calculating unit is used to provide time calculating parameter information to the main control unit, the timing unit is used to provide set timing parameter information to the main control unit, and at least one of a turn-on time and a turn-off time of the flame simulation unit is controlled by the main control unit according to the acquired time calculating parameter information and timing parameter information, and is displayed by means of the display module. The electronic candle according to the above described embodiment includes a load bearing base, a body, and a tray, the load bearing base is provided with an external power interface, a wireless charging circuit is provided within the electronic candlestick, and the tray is provided with a wireless charging coil. The wireless charging circuit is electrically connected to the external power interface and wireless charging coil, and is used to wirelessly charge, by the wireless charging coil, an electronic candle movably connected to the tray with the electrical energy input to the external power interface. Charging is more convenient for the electronic candle by wireless charging. Further, because an opening for the wireless charging interface is not provided in an electronic candle housing, the electronic candle has a more intact appearance, which is more similar to the appearance of a real candle, thereby improving the user experience.

According to a sixth aspect, an electronic candle is provided in an embodiment, the electronic candle comprising a cylindrical simulation housing, a cavity being provided within the simulation housing; the simulation housing comprises an upper candle surface, a base surface and a side surface, wherein a flame opening is provided on the upper candle surface; a flame simulation apparatus, a lifting apparatus, and a lifting drive apparatus are provided within the cavity; the lifting drive apparatus is connected to the lifting apparatus, and the lifting drive apparatus is used to provide the lifting apparatus with a driving force; the lifting apparatus is connected to the flame simulation apparatus, and the lifting apparatus is used to lift the flame simulation device from the flame opening of the upper candle surface when the driving force provided by the lifting drive apparatus is acquired; the flame simulation apparatus is used to simulate a candle flame after being lifted from the flame opening of the upper candle surface; the electronic candle further comprises a warming simulation apparatus; the warming simulation device comprises an annular heating apparatus, and the annular heating apparatus is provided on the edge of the flame opening of the upper candle surface; and the annular heating apparatus is used to heat when electrical energy is acquired, so that the annular heating apparatus radiates heat energy outward to simulate the temperature of the candle flame. In some embodiments, the heating simulation apparatus further comprises a fan, and the fan is provided within the cavity; a vent is provided on the base surface, and the vent is used to place the cavity and the outside of the simulation housing in communication; the fan is used to discharge air within the cavity from the flame opening of the upper candle surface to increase the heat energy radiation range of the annular heating apparatus. In some embodiments, a heating temperature value of the annular heating apparatus is positively correlated with the brightness of a candle flame simulated by the flame simulation apparatus. In some embodiments, a rotational speed of the fan is positively correlated with the brightness of the candle flame simulated by the flame simulation apparatus. In some embodiments, the electronic candle further comprises a blow-out simulation apparatus and a mode switching circuit; the mode switching circuit is provided within the cavity, and the mode switching circuit being used to control the electronic candle to switch to a candle burning mode or a candle extinguishing mode; the blow-out simulation apparatus comprises a pickup and an acoustic wave detection circuit; the pickup is provided on the upper candle surface of the simulation housing, and the pickup is used to collect an acoustic wave signal generated by a blow-out action, convert the collected acoustic wave signal into an acoustic wave electrical signal and then send same to the acoustic wave detection circuit; the acoustic wave detection circuit is provided within the cavity, and is electrically connected to the mode switching circuit; the acoustic wave detection circuit is used to amplify the acoustic wave electrical signal by a preset magnification factor, and when the amplitude of the amplified acoustic signal is greater than a preset amplitude value, and a continuous duration of being greater than the preset amplitude value is over a preset duration, sending a blow-out light electrical signal to the mode switching circuit; and the mode switching circuit is further used to switch the electronic candle to the candle extinguishing mode in response to the blow-out light electrical signal. In some embodiments, the electronic candle further comprises a cotton wick simulation apparatus, wherein the cotton wick simulation apparatus comprises a cotton wick model and a cotton wick conversion apparatus; and the cotton wick conversion apparatus is provided within the cavity, and the cotton wick conversion device is used to lift the cotton wick model from the flame opening of the upper candle surface when the electronic candle is in the candle extinguishing mode, to simulate a cotton wick when the candle is not burning. In some embodiments, the electronic candle further comprises an ignition simulation apparatus used to simulate a candle ignition process; the ignition simulation apparatus comprises a temperature sensor and a temperature detection circuit; the temperature sensor is provided on the cotton wick model, and is used to monitor the temperature of the cotton wick model, and send a temperature value obtained by monitoring the cotton wick model to the temperature detection circuit; the temperature detection circuit is connected to the mode switching circuit, and the temperature detection circuit is used to send a wick ignition electrical signal to the mode switching circuit when the temperature value of the cotton wick model is greater than a preset temperature value; and the mode switching circuit is further used to switch the electronic candle to the candle burning mode in response to the wick ignition electrical signal. In some embodiments, the electronic candle further comprises a gripping-and-lighting simulation apparatus; the gripping-and-lighting simulation apparatus comprises a touch sensor, the side surface of the simulation housing is provided with a gripping region, and the touch sensor is provided on the gripping region; the touch sensor is connected to the mode switching circuit, and the touch sensor is used to send a gripping-and-lighting electrical signal to the mode switching circuit when the gripping region is gripped and operated; and the mode switching circuit is further used to switch the electronic candle to the candle burning mode in response to the gripping-and-lighting electrical signal. In some embodiments, the electronic candle further comprises a power supply module, and the power supply module is used to provide the electronic candle with electrical energy; the power supply module comprises an energy storage battery and a charging circuit; and the charging circuit is used to charge the energy storage battery. In some embodiments, the electronic candle further comprises a low-power shutdown module, and the low-power shutdown module comprises a battery monitoring circuit and a switch control circuit; the battery monitoring circuit is used to monitor an electric quantity parameter of the energy storage battery being charged, and send an electric quantity parameter value obtained by monitoring to the switch control circuit; the switch control circuit is used to turn off the electronic candle when the electric quantity parameter value is less than a preset minimum value; and the switch control circuit is further used to turn on the electronic candle when the electric quantity parameter value is greater than a preset maximum value. According to the electronic candle of the described embodiments, since the annular heating apparatus of the heating simulation apparatus can simulate the temperature of a candle flame, the simulation effect of the electronic candle is better, greatly improving user experience.

According to a seventh aspect, an electronic candle having an air quality monitoring function includes a truncated conical housing. The housing includes an upper bottom surface, a lower bottom surface, and a side surface; the upper bottom surface is provided with a flame piece opening, and the side surface is provided with a display screen; the housing is internally provided with a flame simulating apparatus, a lifting apparatus, a drive apparatus, and a power supply module; the power supply module is connected to the drive apparatus; the power supply module is used for providing power to the drive apparatus; the drive apparatus is connected to the lifting apparatus, and the drive apparatus is used for the lifting apparatus is connected to the flame simulating apparatus, and is used for lifting the flame simulating apparatus from the flame piece opening provided on the upper bottom surface when the driving force provided by the drive apparatus is acquired; the flame simulating apparatus is used for simulating a candle flame after being lifted from the flame piece opening provided on the upper bottom surface; the interior of the housing has a horn-shaped cavity, a narrow mouth of the horn-shaped cavity is located at the flame piece opening on the upper bottom surface, and a wide mouth of the horn-shaped cavity is located on the lower bottom surface; a fan and an air testing module are provided in the horn-shaped cavity; the fan is used for sucking indoor air from the narrow mouth of the horn-shaped cavity and discharging the indoor air from the wide mouth of the horn-shaped cavity; the air testing module comprises a testing motherboard and a plurality of sensor arrays; the testing motherboard is disposed at the wide mouth of the horn-shaped cavity, and is parallel to a plane in which an inner edge of the wide mouth of the horn-shaped cavity is located; the plurality of sensor arrays are used for measuring a parameter of the indoor air; the plurality of sensor arrays are disposed on the testing motherboard, and are evenly and symmetrically arranged in the inner edge of the wide mouth of the horn-shaped cavity, such that when the indoor air is discharged from the wide mouth of the horn-shaped cavity, the indoor air uniformly passes through the sensor arrays; the testing motherboard is electrically connected to the display screen, and is used for displaying the parameter value of the indoor air by means of the display screen. In some embodiments, the testing motherboard is circular, and the plurality of sensor arrays are evenly and symmetrically arranged on the edge of the testing motherboard. In some embodiments, each of the sensor arrays includes a PM2.5 sensor, a temperature and humidity sensor, a carbon dioxide sensor, a TVOC sensor, a negative oxygen ion sensor, and/or a formaldehyde sensor. In some embodiments, the sensor array includes a temperature sensor and/or a humidity sensor disposed in a middle portion of the testing motherboard for measuring the temperature and/or humidity of the indoor air. In some embodiments, the testing motherboard is further provided with a controller, and the controller is connected to each of the sensor arrays and is used for acquiring data of each sensor in each sensor array and averaging the data of the same sensor to obtain the parameter of the indoor air. In some embodiments, the testing motherboard is further provided with a wireless communication apparatus for sending the parameter of the indoor air to a mobile terminal and/or a cloud server. In some embodiments, the wireless communication apparatus comprises a Wi-Fi module and/or a Zigbee module. In some embodiments, the controller is connected to the display screen, and the display screen is used for displaying the parameter value of the indoor air; and the display screen is a curved screen. In some embodiments, the testing motherboard is further provided with an alarm apparatus, and the alarm apparatus is connected to the controller and is used for issuing an alarm when the parameter of the indoor air triggers an alarm condition. In some embodiments, the electronic candle further includes a touch screen; the touch screen is electrically connected to the controller, and is used for shutting down and starting up the testing motherboard after being triggered by a user; and the touch screen is disposed above the display screen. In the electronic candle according to the above embodiments, since the air testing module is provided in the housing of the electronic candle, the electronic candle has an air quality monitoring function, thereby improving the user experience.

According to an eighth aspect, an electronic candle includes a candle main body, a rechargeable battery, a frame, a driving mechanism, a mimetic candle flame light-emitting assembly, a closing mechanism, and a control module; wherein the candle main body comprises a candle body and a base, the candle body is provided at one end thereof with an inwardly formed internal cavity having an opening, the candle body is provided at the other end thereof with an access hole in communication with the internal cavity, the candle body is sleeved on the outer side of the base, and a mounting cavity is bounded by the candle body and the base; the rechargeable battery, the frame, the driving mechanism, and the closing mechanism are all disposed in the mounting cavity, the base is provided with a charge port connected to the rechargeable battery, the rechargeable battery, the mimetic candle flame light-emitting assembly, and the driving mechanism are all connected to the control module, and the rechargeable battery is used for providing a power supply; the frame is slidably disposed in the mounting cavity, and the frame is fixedly connected to the candle body; the driving mechanism is mounted on the frame, and the mimetic candle flame light-emitting assembly and the frame are both in transmission connection with the driving mechanism; the control module is connected to the mimetic candle flame light-emitting assembly and the driving mechanism; the driving mechanism is used for driving the mimetic candle flame light-emitting assembly to extend out of the access hole to the exterior of the candle body, used for driving the mimetic candle flame light-emitting assembly to retract from the access hole to the interior of the candle body, used for driving the frame to move in a direction away from the base to expose the charge port, and used for driving the frame to move in a direction toward the base to block the charge port through the candle body; the closing mechanism is used for opening the access hole during a process in which the mimetic candle flame light-emitting assembly extends out of the access hole to the exterior of the candle body, and used for closing the access hole during a process in which the mimetic candle flame light-emitting assembly retracts from the access hole to the interior of the candle body; the charge port is further provided with a charge detection module which is used to detect whether a charge plug is inserted into the charge port, the charge detection module is connected to the control module, and when insertion of the charge plug into the charge port is detected, the control module controls the driving mechanism to drive the frame to keep away from the base, so as to expose the charge port. In an embodiment, the driving mechanism comprises: a driving motor, a gear set, a frame rack, a base rack, and a linkage slide block; the driving motor is connected to the control module, the frame rack is connected to the mimetic candle flame light-emitting assembly, the base rack is connected to the base, the driving motor is fixed to the frame, the gear set is rotatably mounted on the frame, and the driving motor is in transmission connection with the gear set to drive the gear set to rotate; the frame rack and the base rack are slidably disposed on the frame, and the frame rack and the base rack are both slidably connected to the linkage slide block; the linkage slide block can slide back and forth between a first position and a second position, and at the first position, the linkage slide block causes the base rack to engage with the gear set and the frame rack to disengage from the gear set; at the second position, the linkage slide block causes the frame rack to engage with the gear set and the base rack to disengage from the gear set; when the frame rack engages with the gear set, the driving motor drives the gear set to rotate, so as to drive, through the gear set, the frame rack to move back and forth along a length direction thereof, thereby driving the mimetic candle flame light-emitting assembly to extend or retract from the access hole; when the base rack engages with the gear set, the driving motor drives the gear set to rotate, so as to drive, through the gear set, the base rack to move back and forth along a length direction thereof, thereby driving the candle body to move back and forth in a direction away from or toward the base. In an embodiment, the driving mechanism further comprises a frame guide groove mounted on the base, and the frame is slidably disposed in the frame guide groove. In an embodiment, the driving mechanism further comprises a frame buffer member disposed between the frame and the base to buffer the frame when the frame moves in the direction toward the base. In an embodiment, the driving mechanism further comprises a gear cover and a frame cover respectively disposed on two opposite sides of the frame, and the gear cover covers a side of the frame provided with the gear set; the mimetic candle flame light-emitting assembly is disposed between the gear cover and the frame cover; the gear cover is provided with a rack guide portion, and the base rack is slidably disposed on the rack guide portion. In an embodiment, the gear set comprises a driving gear and driven gears, the driven gears comprise a primary driven gear, a frame secondary driven gear, and a base secondary driven gear, and the frame secondary driven gear and the base secondary driven gear are respectively fixed on two opposite sides of the primary driven gear and coaxial with the primary driven gear; the driving gear engages with the primary driven gear; the frame secondary driven gear is used for engaging with the frame rack, and the base secondary driven gear is used for engaging with the base rack. In an embodiment, the linkage slide block is disposed between the frame rack and the base rack, the linkage slide block is provided with a first vertical guide groove and a first inclined guide groove on one side thereof that faces the frame rack, and the frame rack is provided with a frame guide column which can slide along the first vertical guide groove to the first inclined guide groove such that the linkage slide block slides to the first position; the linkage slide block is provided with a second vertical guide groove and a second inclined guide groove on one side thereof that faces the base rack, and the base rack is provided with a base guide column which can slide along the second vertical guide groove to the second inclined guide groove such that the linkage slide block slides to the second position. In an embodiment, the base is provided with a battery level indicator which is used for indicating a battery level of the rechargeable battery by displaying different colors. In an embodiment, the electronic candle further comprises a sensing element used for acquiring at least one of an acoustic wave signal, a touch signal, and a pressure signal, converting the acquired acoustic wave signal or touch signal, or an electrical signal into a control electrical signal, and transmitting the control electrical signal to the control module, so as to output one of a turning-on command, a turning-off command, a working mode command, and a timing command through the control module. In an embodiment, the electronic candle further comprises a remote control receiving unit connected to the control module and used for receiving a remote control signal. In the electronic candle according to the above embodiments, the driving mechanism can drive the frame to move in the direction away from the base, thus driving the candle body to move in the direction away from the base to expose the charge port; on the other hand, the driving mechanism can drive the frame to move in the direction toward the base, thus driving the candle body to move in the direction toward the base to block the charge port. As such, the electronic candle is closer to a real candle during use and the aesthetics of the electronic candle is improved. Meanwhile, through the detection carried out by the charge detection module, the driving mechanism can maintain a state of the candle body with respect to the base during a charge process, thus the charge port can remain in an exposed state, and thereby improving the use safety of the electronic candle.

According to a nineth aspect, an electronic candle includes a housing, provided with an access hole; an opening and closing mechanism, configured to open or close the access hole; a moving mechanism, located in the housing; a light-emitting mechanism, connected to the moving mechanism; a base, provided with a charging port; and a control module, configured to control the light-emitting mechanism to be in a turn-on state or a turn-off state; wherein the moving mechanism comprises a driving assembly, a linked slide block, and a lamp bracket fixed in the housing; the driving assembly comprises a lamp bracket rack, a base rack, a driving element, and a gear set; the lamp bracket rack is connected to the light-emitting mechanism, and the light-emitting mechanism is movably arranged on the lamp bracket; the base rack is fixed in the base, both the driving element and the gear set are arranged on the lamp bracket, and the driving element is configured to rotate the gear set; the driving assembly comprises a first state and a second state; in the first state, the gear set is engaged with the lamp bracket rack, and the driving assembly is configured to extend or retract the light-emitting mechanism from or into the housing; in the second state, the gear set is engaged with the base rack, and the driving assembly is configured to drive the housing to rise or descend relative to the base so as to expose or cover the charging port; and the linked slide block is configured to switch an engagement object of the gear set by means of sliding. In some embodiments, the gear set comprises a transmission gear and a double circular gear, the double circular gear comprising a main gear and a pair of pinions fixed on two sides of the main gear; and the transmission gear is engaged with the main gear, the lamp bracket rack is configured to be engaged with the pinion close to one side of the lamp bracket, and the base rack is configured to be engaged with the pinion distant from one side of the lamp bracket. In some embodiments, the linked slide block is located between the lamp bracket rack and the base rack and is slidably connected to the lamp bracket; a first guide groove is arranged on the side of the linked slide block close to the lamp bracket rack, and a second guide groove is arranged on the side of the linked slide block close to the base rack; a lamp bracket guide post on the lamp bracket rack is configured to slide along the first guide groove, and a base guide post on the base rack is configured to slide along the second guide groove; and a bent portion is arranged on each of the first guide groove and the second guide groove, the bent portion being configured to switch an engagement object of the double circular gear. In some embodiments, a slide portion is arranged on the linked slide block, a slide groove is provided on the lamp bracket, and the slide portion is slidably connected to the slide groove. In some embodiments, the driving assembly further comprises a gear cover and a lamp bracket cover, the gear cover being fixed onto the lamp bracket which is provided with the gear set on one side, and the lamp bracket cover being fixed onto the lamp bracket; and the light-emitting mechanism is located between the lamp bracket and the lamp bracket cover. In some embodiments, a rack guide portion is arranged on the gear cover, and the base rack slidingly fits with the rack guide portion. In some embodiments, an avoidance hole is provided on the gear cover, and at the avoidance hole, the gear set is engaged with the base rack. In some embodiments, a limit portion is arranged on the gear cover, the limit portion being configured to limit a range of motion of the base rack relative to the gear set. In some embodiments, a position switch is arranged in the housing, the position switch being configured to obtain position information and send the position information to the control module; and the control module is configured to control a working state of the driving assembly according to the obtained position information. In some embodiments, the position switch is fixed onto the lamp bracket; and a touch control portion is arranged on the lamp bracket rack, the touch control portion being configured to be in contact with the position switch. In the electronic candle according to the above embodiments, the driving assembly on the moving mechanism comprises the first state and the second state; in the first state, the light-emitting mechanism can extend or retract from or into the housing, that is, the rising or descending of the light-emitting mechanism can be implemented; and in the second state, a rising or descending function of the housing can be achieved, so as to expose or cover the charging port. In the first state of the driving assembly, the light-emitting mechanism can be placed into the housing when not in use, thereby avoiding dust pollution, and effectively protecting the light-emitting mechanism to prolong the service life of the light-emitting mechanism. In the second state of the driving assembly, the charging port can be effectively prevented from being exposed to the outside for a long time, thereby avoiding dust pollution, protecting the charging port and internal components, and prolonging the service life of the electronic candle. The linked slide block on the moving mechanism can switch the driving assembly between the first state and the second state, such that one driving element is shared in the first state and the second state, thereby simplifying the structural design of the electronic candle and lowering costs.

Some of the components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Some of the embodiments related to operations such as processing of signals or performing certain tasks and processes, described herein are described in the general context of methods or processes, which may be implemented at least in-part by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The foregoing is merely illustrative of the preferred embodiments of the present disclosure and is not intended to limit the present disclosure. Various changes and modifications may be made by those skilled in the art. Any modifications, equivalent alternatives are improvements that are made without departing from the spirit and principles of the present disclosure are to be encompassed by the scope of the present disclosure.

What is claimed is:

1. An electronic candle device, comprising:

a flame sheet; and a candle body having an adjustable height and comprising:

an upper housing that includes an opening, the upper housing having a first diameter;

a lower housing having a second diameter that is different than the first diameter;

a first motor coupled to the lower housing or the upper housing and configured to cause a relative movement between the upper housing and the lower housing to adjust the height of the electronic candle device;

a gear set coupled to the flame sheet;

a second motor coupled to the gear set and configured to cause the gear set to drive the flame sheet to extend through the opening when a first mode of operation of the electronic candle device is activated and retract within the candle body when a shut-down mode of the electronic candle device is activated; and a control circuit positioned within the candle body and configured to switch an operation of the electronic candle device between the first mode and the shut-down mode, wherein the electronic candle device simulates a burning real candle when it operates in the first mode.

2. The electronic candle device of claim 1, comprising a heating element positioned close to an edge of the opening of the upper housing and configured to radiate heat outward to simulate a temperature of a real candle flame when the electronic candle device operates in the first mode.

3. The electronic candle device of claim 1, wherein the first diameter is smaller than the second diameter, and wherein the upper housing is fully or partially positioned within the lower housing upon a height of the electronic candle device reaching a minimal value.

4. The electronic candle device of claim 1, wherein the first diameter is greater than the second diameter, and wherein the lower housing is fully or partially positioned within the upper housing upon a height of the electronic candle device reaching a minimal value.

5. The electronic candle device of claim 1, wherein the first motor is coupled to the lower housing and the upper housing via an extendable and retractable apparatus that comprises two tracks, each coupled to the upper housing and the lower housing respectively.

6. The electronic candle device of claim 1, comprising a detection circuit configured to collect an acoustic wave signal generated by a blow-out action to enable switching between the first mode and the shut-down mode.

7. The electronic candle device of claim 1, comprising:

a rechargeable battery, and a charging port positioned on a side surface of the upper housing or the lower housing, wherein the charging port is hidden upon the upper housing and the lower housing at least partially overlapping with each other.

8. The electronic candle device of claim 7, comprising a power supply monitoring circuit configured to monitor a level of energy in the rechargeable battery, wherein the power supply monitoring circuit is configured to send a signal to the first motor such that the charging port is exposed upon the level of energy in the rechargeable battery is below a preset threshold value.

9. The electronic candle device of claim 1, comprising:

one or more magnetic blocks positioned on a bottom surface of the electronic candle device; and a charging circuit, wherein the one or more magnetic blocks are configured to connect the charging circuit to an external power interface to charge the electronic candle device.

10. The electronic candle device of claim 9, wherein the charging circuit is configured to wirelessly charge the electronic candle device.

11. The electronic candle device of claim 9, comprising a candlestick removably positioned below the candle body, the candlestick comprising a tray, and a base positioned below the tray, wherein the tray comprises one or more magnetic attachments positioned on a top surface of the tray.

12. The electronic candle device of claim 11, wherein each of the one or more magnetic attachments corresponds to each of the one or more magnetic blocks.

13. The electronic candle device of claim 11, wherein the tray comprises one or more wireless charging coils coupled to the charging circuit configured to charge an energy storage element in the candle body.

14. The electronic candle device of claim 1, comprising a cap removably positioned over the flame sheet to protect the flame sheet.

15. The electronic candle device of claim 1, comprising a curved display positioned on a side surface of the candle body.

16. The electronic candle device of claim 15, wherein the curved display comprises multiple display regions, each of the multiple display regions configured to display a different scene.

17. The electronic candle device of claim 1, comprising one or more vents positioned on a bottom surface of the candle body, wherein the one or more vents are configured to discharge heat within the candle body into an external environment.

18. The electronic candle device of claim 17, comprising a fan positioned within a cavity of the candle body to direct the heat within the candle body to the external environment through the one or more vents.

19. The electronic candle device of claim 18, wherein the cavity is of a horn shape having a first, narrow opening and a second, wider opening, and wherein the fan is configured to direct air from the first, narrow opening into the cavity and discharge the air from the cavity to the external environment through the second, wider opening.

20. The electronic candle device of claim 1, comprising a sensor array configured to monitor an air quality.

* * * * *